(12) United States Patent
Schultz et al.

(10) Patent No.: US 11,086,059 B2
(45) Date of Patent: Aug. 10, 2021

(54) IMAGE LIGHT GUIDE WITH EXPANDED LIGHT DISTRIBUTION OVERLAPPING GRATINGS

(71) Applicant: Vuzix Corporation, West Henrietta, NY (US)

(72) Inventors: Robert J. Schultz, Victor, NY (US); Paul J. Travers, Honeoye Falls, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/622,885

(22) PCT Filed: Jun. 12, 2018

(86) PCT No.: PCT/US2018/036999
§ 371 (c)(1),
(2) Date: Dec. 13, 2019

(87) PCT Pub. No.: WO2018/231754
PCT Pub. Date: Dec. 20, 2018

(65) Prior Publication Data
US 2020/0209630 A1     Jul. 2, 2020

Related U.S. Application Data

(60) Provisional application No. 62/528,662, filed on Jul. 5, 2017, provisional application No. 62/518,636, filed on Jun. 13, 2017.

(51) Int. Cl.
*G02B 27/01*     (2006.01)
*G02B 5/18*      (2006.01)

(52) U.S. Cl.
CPC ..... *G02B 5/1823* (2013.01); *G02B 2027/0174* (2013.01)

(58) Field of Classification Search
CPC .. G02B 27/0172; G02B 27/174; G02B 6/011; G02B 6/0036; G02B 6/29323; G02B 6/29329; G02B 5/18; G02B 5/1842
(Continued)

(56) References Cited

U.S. PATENT DOCUMENTS

| 5,148,302 A | 9/1992 | Nagano et al. |
| 5,455,693 A | 10/1995 | Wreede et al. |

(Continued)

FOREIGN PATENT DOCUMENTS

| CA | 2962899 A1 | 4/2016 |
| CN | 104040410 A | 9/2014 |

(Continued)

OTHER PUBLICATIONS

European Patent Office, Extended European Search Report from European Patent Application No. 18816756, dated Dec. 16, 2020.
(Continued)

*Primary Examiner* — Robert Tavlykaev
(74) *Attorney, Agent, or Firm* — Harter Secrest & Emery LLP; Thomas B. Ryan; Jacob D. Merrill, Esq.

(57) ABSTRACT

An image light guide for conveying a virtual image has a waveguide that conveys image-bearing light, formed as a flat plate having an in-coupling diffractive optic with a first grating vector diffracting an image-bearing light beam into the waveguide and directing diffracted light. An out-coupling diffractive optic is formed as a plurality of overlapping diffraction gratings including a first grating pattern having first grating vector k1 and a second grating pattern having a second grating vector k2 for expanding and ejecting the expanded image bearing beams from the waveguide into an expanded eyebox within which the virtual image can be seen.

24 Claims, 32 Drawing Sheets

(58) Field of Classification Search
USPC .......................................................... 385/37
See application file for complete search history.

(56) References Cited

U.S. PATENT DOCUMENTS

| | | | |
|---|---|---|---|
| 5,469,277 | A | 11/1995 | Kavehrad et al. |
| 6,324,004 | B1 | 11/2001 | Staub et al. |
| 7,181,103 | B1* | 2/2007 | Greiner .................. G02B 6/124 385/14 |
| 7,453,612 | B2 | 11/2008 | Mukawa |
| 8,049,966 | B2 | 11/2011 | Chann |
| 8,160,411 | B2 | 4/2012 | Levola et al. |
| 8,548,290 | B2 | 10/2013 | Travers |
| 8,593,734 | B2* | 11/2013 | Laakkonen ........ G02B 6/12007 359/630 |
| 9,646,235 | B2 | 5/2017 | Pranov |
| 9,746,785 | B2 | 8/2017 | Van Der Schaar |
| 10,007,117 | B2 | 6/2018 | Schultz |
| 10,038,840 | B2* | 7/2018 | Vallius ............... H04N 5/23218 |
| 10,156,725 | B2 | 12/2018 | TeKolste et al. |
| 10,261,318 | B2 | 4/2019 | TeKolste et al. |
| 10,359,632 | B2 | 7/2019 | Schultz |
| 2002/0145960 | A1* | 10/2002 | Worthington .......... G01N 21/07 369/47.48 |
| 2006/0291021 | A1 | 12/2006 | Mukawa |
| 2009/0245730 | A1* | 10/2009 | Kleemann .......... G02B 27/4272 385/37 |
| 2010/0110556 | A1 | 5/2010 | Chann et al. |
| 2011/0204484 | A1 | 8/2011 | Van Der Schaar et al. |
| 2011/0242635 | A1* | 10/2011 | Oka .................. G02B 27/0172 359/207.7 |
| 2012/0002272 | A1 | 1/2012 | Chann |
| 2013/0051730 | A1 | 2/2013 | Travers |
| 2013/0314789 | A1* | 11/2013 | Saarikko ............ G02B 27/0905 359/489.07 |
| 2014/0300966 | A1 | 10/2014 | Travers |
| 2015/0226970 | A1 | 8/2015 | Mukawa |
| 2015/0277375 | A1* | 10/2015 | Large ................. G02B 27/0081 250/214 AL |
| 2016/0070999 | A1 | 3/2016 | Pranov et al. |
| 2016/0116739 | A1 | 4/2016 | TeKolste |
| 2017/0038593 | A1 | 2/2017 | Travers |
| 2017/0075119 | A1 | 3/2017 | Schultz et al. |
| 2017/0102543 | A1* | 4/2017 | Vallius .................. G06T 19/006 |
| 2017/0160548 | A1 | 6/2017 | Woltman et al. |
| 2017/0199384 | A1* | 7/2017 | Yeoh .................. G02B 27/0172 |
| 2017/0248789 | A1* | 8/2017 | Yokoyama ............. G02B 6/124 |
| 2017/0322419 | A1 | 11/2017 | TeKolste |
| 2017/0371160 | A1 | 12/2017 | Schultz |
| 2018/0081176 | A1* | 3/2018 | Olkkonen .......... G02B 27/0081 |
| 2018/0210205 | A1* | 7/2018 | Grey ................. G02B 27/0172 |
| 2018/0232048 | A1* | 8/2018 | Popovich ............. G02F 1/2955 |
| 2019/0121142 | A1 | 4/2019 | TeKolste et al. |
| 2019/0243141 | A1 | 8/2019 | TeKolste et al. |
| 2019/0361242 | A1 | 11/2019 | Schultz |
| 2020/0064630 | A1 | 2/2020 | Pfeiffer et al. |
| 2020/0088932 | A1 | 3/2020 | Schultz et al. |
| 2020/0096771 | A1 | 3/2020 | Oh et al. |
| 2020/0209630 | A1 | 7/2020 | Schultz |
| 2020/0241304 | A1* | 7/2020 | Popovich ........... G02B 27/0081 |

FOREIGN PATENT DOCUMENTS

| | | |
|---|---|---|
| EP | 0981065 A2 | 2/2000 |
| EP | 1016817 B1 | 10/2003 |
| EP | 2241926 A1 | 4/2009 |
| EP | 2083310 A2 | 7/2009 |
| JP | 2015149700 A | 8/2014 |
| WO | 9952002 A1 | 10/1999 |
| WO | 2006035811 A1 | 4/2006 |
| WO | 2006064334 A1 | 6/2006 |
| WO | 2007042852 A1 | 4/2007 |
| WO | 2013180737 A1 | 5/2013 |
| WO | 2004005556 A1 | 6/2013 |
| WO | 2016011367 A2 | 1/2016 |
| WO | 2016020643 A1 | 2/2016 |
| WO | 2016112130 A1 | 7/2016 |
| WO | 2017039820 A1 | 3/2017 |
| WO | 2017062139 A1 | 4/2017 |
| WO | 2018125574 A1 | 7/2018 |

OTHER PUBLICATIONS

U.S. Patent and Trademark Office (ISA/US), International Search Report from International Application No. PCT/US2017/066181, dated Mar. 1, 2018.
U.S. Patent and Trademark Office (ISA/US), International Search Report from International Application No. PCT/US2018/036999, dated Oct. 22, 2018.
Japanese Patent Office (JPO), Notice of Reasons for Rejection from Japanese Patent Application No. 2019-568106, dated Jan. 26, 2021.
China National Intellectual Property Administration (CNIPA), First Office Action from Chinese Patent Application No. 201880052577.3, dated Oct. 21, 2020.
Levola, Tapani, "Diffractive Optics for Virtual Reality Displays," Journal of the SID, 14/5, pp. 467-475, 2006.
Joannopoulos, John D. et al., Photonic Crystals: Molding the Flow of Light, 2d ed., 2008, Ch. 5, pp. 66-67, Princeton University Press, United States (http://ab-initio.mit.edu/book/photonic-crystals-book.pdf.).
Lin, S.Y. et al., Demonstration of Highly Efficient Waveguiding in a Photonic Crystal Slab at the 1.5um Wavelength, Optics Letters, vol. 25, No. 17, pp. 1297-1299, Sep. 1, 2000.

* cited by examiner

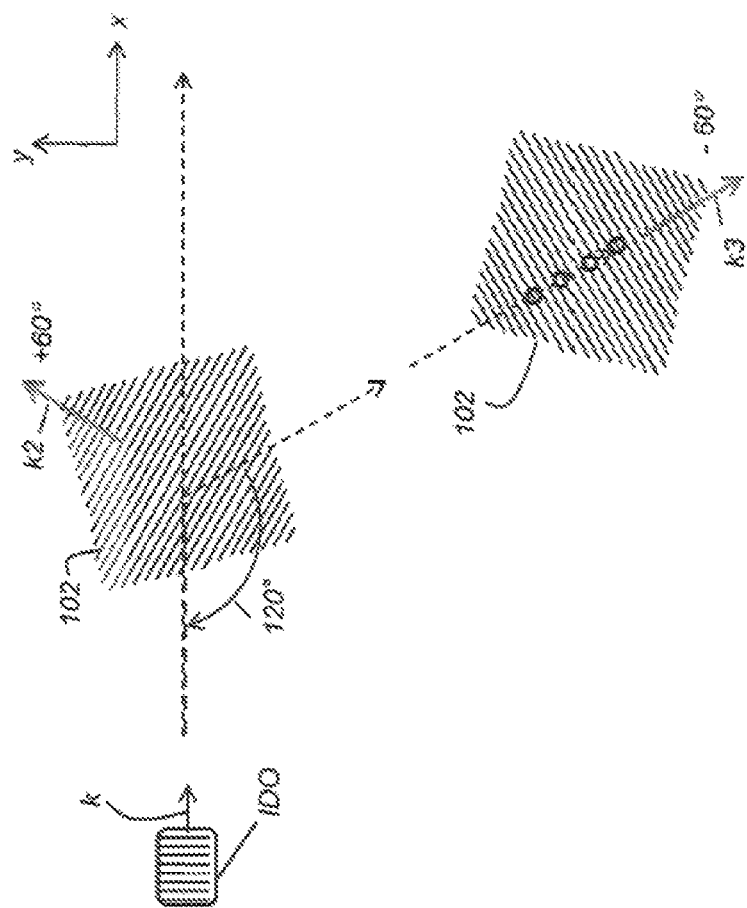

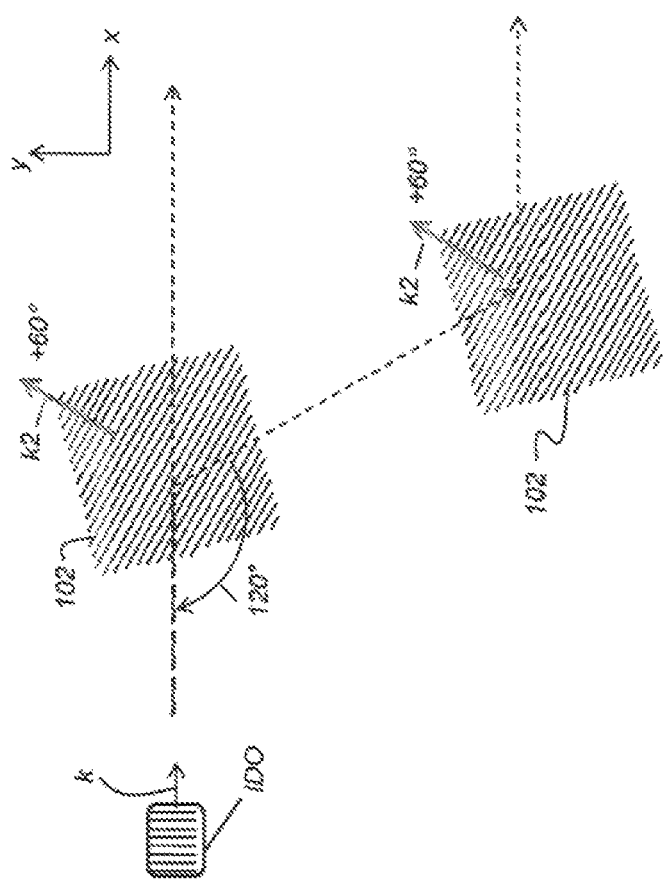

| Direction of incidence | Response at +60° grating (vector k2) | Response at -60° grating (vector k3) |
|---|---|---|
| 0° ----> | Turn to -60° ↗ | Turn to +60° ↖ |
| +60° ↗ | Turn to 0° ----> | Output |
| -60° ↖ | Output | Turn to 0° ----> |

FIG. 6

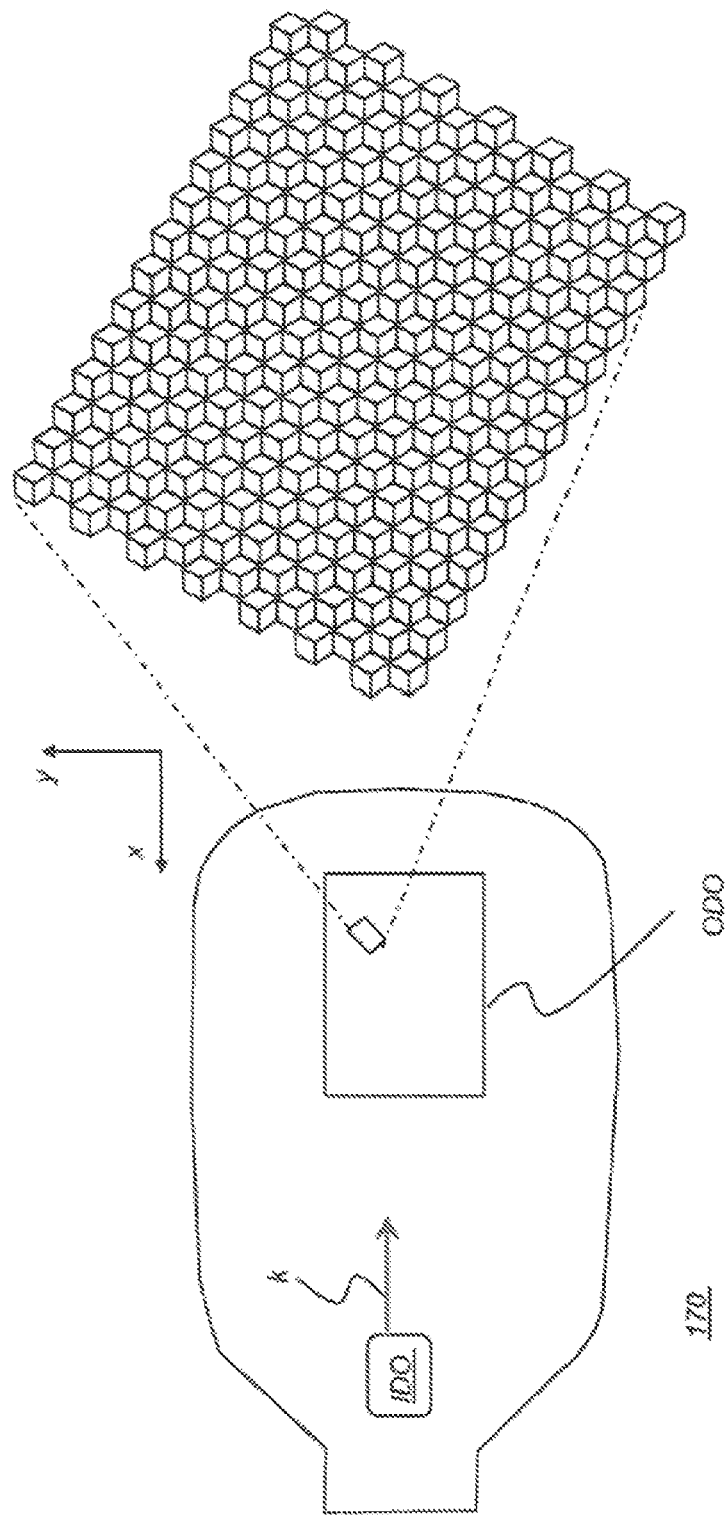

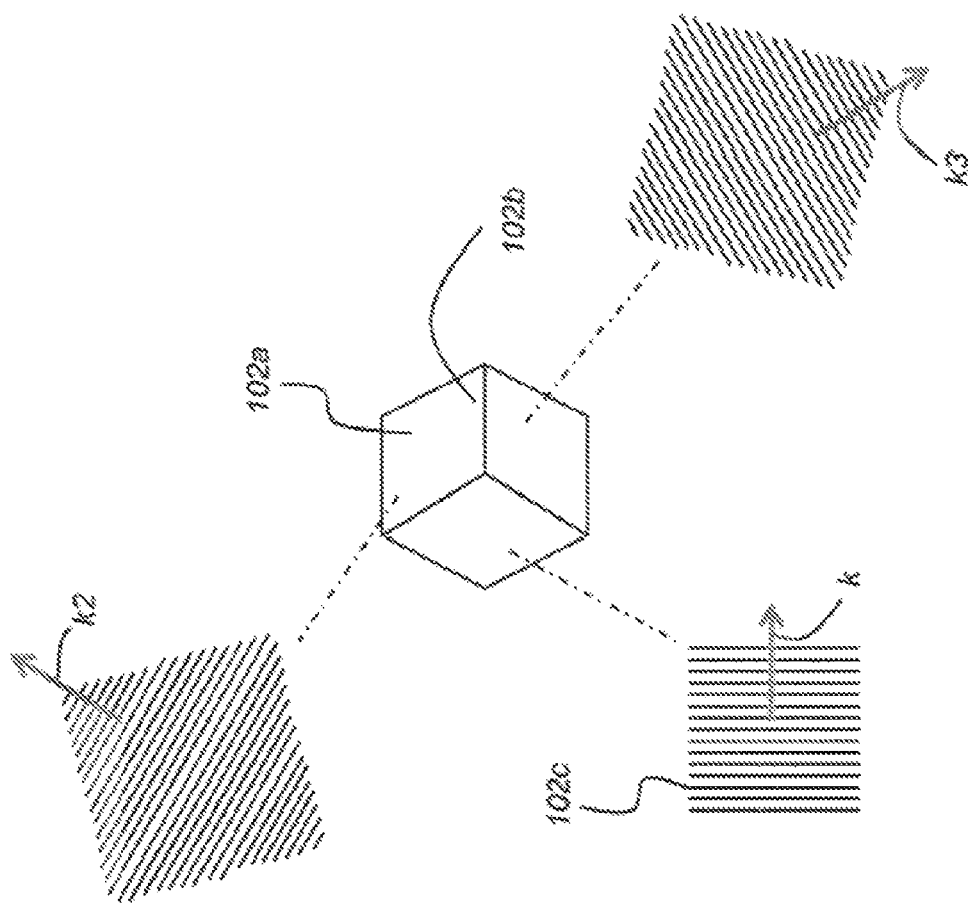

| Direction of incidence | Response at +0° grating (vector k) | Response at +60° grating (vector k) | Response at -60° grating (vector k3) |
|---|---|---|---|
| 0° →   | Output | Turn to -60° | Turn to +60° |
| +60° ↗ | Turn to +120° | Turn to 0° → | Output |
| -60° ↘ | Turn to -120° | Output | Turn to 0° |
| +120° ↖ | Turn to +60° | Turn to 180° ← | Output |
| -120° ↙ | Turn to -60° | Output | Turn to 180° |
| 180° ← | Output | Turn to +120° | Turn to -120° |

FIG. 8C

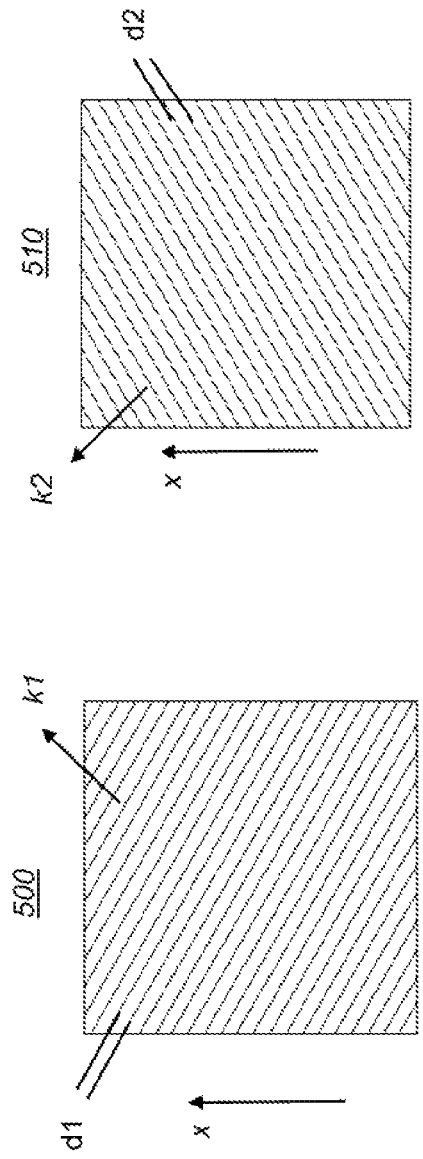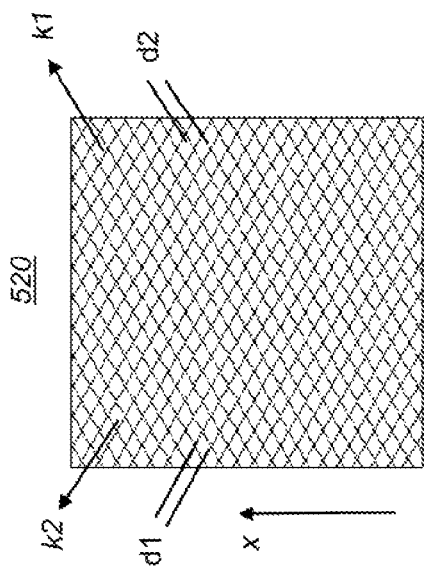
FIG. 13A
FIG. 13B
FIG. 13C

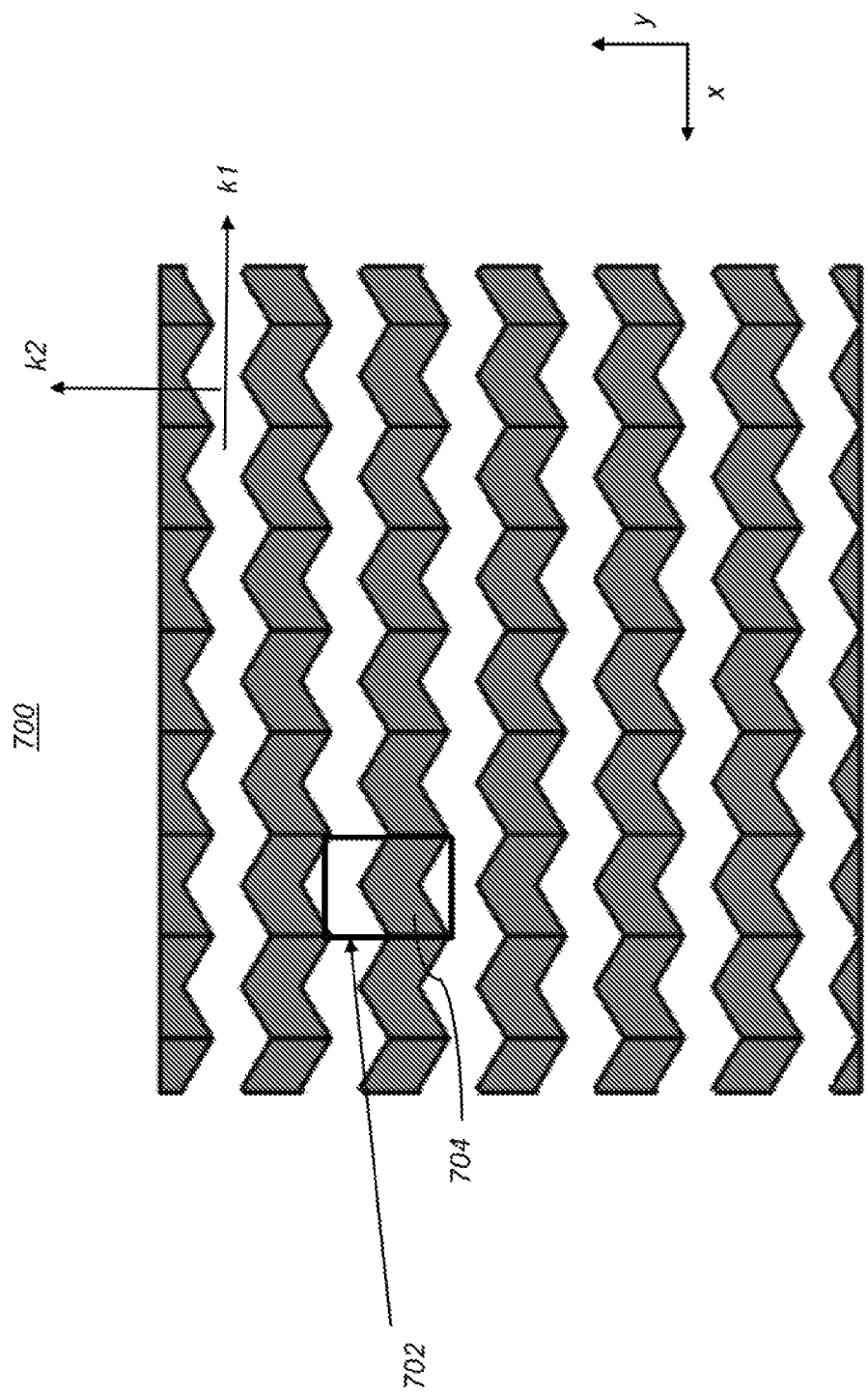

IMAGE LIGHT GUIDE WITH EXPANDED LIGHT DISTRIBUTION OVERLAPPING GRATINGS

TECHNICAL FIELD

This invention generally relates to electronic displays and more particularly relates to displays that use image light guides with diffractive optics to convey image-bearing light to a viewer.

BACKGROUND OF THE INVENTION

Head-Mounted Displays (HMDs) are being developed for a range of diverse uses, including military, commercial, industrial, fire-fighting, and entertainment applications. For many of these applications, there is value in forming a virtual image that can be visually superimposed over the real-world image that lies in the field of view of the HMD user. Optical image light guides convey image-bearing light to a viewer in a narrow space for directing the virtual image to the viewer's pupil and enabling this superposition function.

In such conventional image light guides, collimated, relatively angularly encoded light beams from an image source are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image. In addition, a turning grating can be positioned along the waveguide between the input and output gratings to provide pupil expansion in an orthogonal dimension of the virtual image. The image-bearing light output from the waveguide provides an expanded eyebox for the viewer.

Although conventional image light guide arrangements have provided significant reduction in bulk, weight, and overall cost of near-eye display optics, further improvements are needed. In some instances, the size of the eyebox is constrained, forcing HMD designs to limit tolerances for movement and device placement. Light can often be unevenly distributed over the visual field, leading to hot spots, such as higher levels of light within the center of the field and lower light levels within the field periphery. Beam management functions within the waveguide including beam expansion and light distribution functions can increase the size of waveguides as well as their manufacturing cost and complexity.

SUMMARY OF INVENTION

Embodiments feature compact designs of image light guides for carrying out various functions including pupil expansion, light distribution, and beam management. For example, instead of expanding the two orthogonal dimensions of the image-bearing beams in separate stages requiring different areas of the light guides to be dedicated to the orthogonal expansions, embodiments add capabilities to out-coupling diffractive optics for expanding both dimensions of the image-bearing beams while ejecting the expanded image-bearing beams in overlapping positions within an eyebox. Additional design parameters can be exploited for influencing light distributions within and between the image-bearing light beams. The added functionalities of the out-coupling diffractive optic enable more compact designs and the ability to maintain desired angular relationships among the image-bearing beams for presenting well-corrected virtual images within the expanded eyeboxes.

An image light guide in accordance with one or more embodiments includes a waveguide having a transmissive substrate with front and back surfaces for propagating image-bearing light beams along a length of the waveguide. An in-coupling diffractive optic formed along the waveguide diffracts the image-bearing light beams from an image source into the waveguide for propagating the image-bearing light beams along the length of the waveguide in an angularly encoded form. An out-coupling diffractive optic spaced apart from the in-coupling diffractive optic along the length of the waveguide diffracts the image-bearing light beams from the waveguide in an angularly decoded form toward an eyebox for viewing the image from the image source.

The out-coupling diffractive optic includes a plurality of grating patterns in different orientations that overlap along the length of the waveguide. The overlap can occur within the same plane of the waveguide or within different generally parallel planes. One or more of the grating patterns is arranged in a primary orientation for successively diffracting first portions of each of the image-bearing light beams both in the angularly decoded form toward the eyebox and in the encoded form for further propagation in an original nominal direction along the waveguide. A nonzero order of diffraction matching a similar nonzero order of diffraction of the in-coupling diffractive optic is generally responsible for diffracting the successive first portions out of the waveguide in the angularly decoded form, and a zero order of diffraction is generally responsible for further propagating other of the first portions in the original nominal direction for supporting successive encounters with the overlapping grating patterns. One or more other of the grating patterns is arranged in one or more non-primary orientations for diffracting second portions of each of the image-bearing light beams out of the original nominal direction of propagation along the waveguide and for further diffracting the second portions of each of the image-bearing light beams back toward the original nominal direction of propagation along the waveguide in positions that are relatively offset in a direction normal to the original nominal direction of propagation. The combination of nonzero-order and zero-order diffractions of the second portions provide for successively displacing the second portions in a direction normal to the original nominal direction of propagation.

The first portions of each of the image-bearing light beams are preferably relatively displaced in the original nominal direction of propagation along the waveguide for expanding a first dimension of an area of overlap among the image-bearing light beams within the eyebox. The second portions of each of the image-bearing light beams are preferably relatively displaced in the direction normal to the original nominal direction of propagation along the waveguide for expanding a second dimension of the area of overlap among the image-bearing light beams within the eyebox. The so-expanded eyebox provides an expanded pupil within which the intended virtual image can be seen.

The one or more of the grating patterns arranged in a primary orientation can include a first grating pattern having a first grating vector, and the one or more other of the grating patterns arranged in one or more of the non-primary orientations can include a second grating pattern having a second grating vector. The second grating vector (considered as an undirected line segment) is preferably inclined at an angle of at least 30 degrees to the first grating vector (considered as an undirected line segment), but relative orientations around 45 degrees or 60 degrees can provide additional advantages. One or more other of the grating patterns arranged in one or more of the non-primary orientations can include a third grating pattern having a third grating vector. The second and third grating vectors can be inclined to the first vector by approximately the same amount in different directions. The second and third grating vectors respectively define a second pitch and a third pitch that can be equal to each other. The first grating vector can define a first pitch that can be the same or different from the second and third pitches.

The out-coupling diffractive optic can be formed as a diffraction lattice containing a plurality of unit cells in a plane defining a plurality of diffraction patterns in different orientations within the plane. The unit cells can be in the shape of polygons such as rectangles or hexagons for providing orderly relationships among the diffraction patterns, including relative orientation and pitch. The diffraction patterns provide for expanding each of the image-bearing beams in two dimensions for increasing areas of overlap within the eyebox. Preferably, the diffraction lattice comprises a plurality of diffractive features that are arranged in a pattern and distinguished by a refractive index difference within the plane. The plane includes horizontal and vertical dimensions and the diffractive features can have corresponding horizontal and vertical dimensions that are not equal to regulate distributions of light within each of the image-bearing beams. Portions of the diffractive features can overlap, or the diffractive features can be spaced apart from surrounding features. The diffractive features can also be formed in the shape of polygons such as rectangles or hexagons or can be formed as more rounded shapes such as circles, ellipses, or other oblong shapes.

For example, the plurality of diffraction patterns of the diffraction lattice can be arranged for diffracting portions of each image-bearing light beam into at least three different directions. A first of the diffraction patterns diffracts first portions of the image-bearing light beams both from the waveguide toward the eye box in an angularly decoded form and along an original nominal direction of propagation in their original encoded form. The relative displacements of the first portions of the image-bearing light beams in the original nominal direction of propagation contribute to expanding a first dimension of an area of overlap among the image-bearing light beams within the eyebox. A second and a third of the diffraction patterns diffract second portions of the image-bearing light beams in directions that are different from the original nominal direction of propagation along the waveguide. For example, the second portions can be redirected near 45 degrees or near 60 degrees from the original nominal direction of propagation. At least one of the second and third diffraction patterns diffracts the second portions back towards the original nominal propagation direction in laterally offset positions along the waveguide. The relative lateral displacements of the second portions of the image-bearing light beams contribute to expanding a second dimension of the area of overlap among the image-bearing light beams within the eyebox. Preferably, diffractions of the second portions that further angularly encode the image-bearing beams, i.e., change the distributions of angular orientations among the image-bearing beams, are matched with further diffractions of the second portions that decode such further encoding to restore the originally encoded distributions of angular orientations among the image-bearing beams.

The out-coupling diffractive optic with multiple grating patterns can take a variety of forms. For example, the out-coupling diffractive optic can be formed as volume holographic optical element (HOE) having multiple sub-elements. Such a volume HOE can be formed from a volume-recording medium with a plurality of holographic sub-elements recorded therein, overlapping within the volume of the medium. Considered separately, each sub-element of the volume HOE can function as a diffraction grating having a grating vector in a direction different from the other sub-elements comprising the total volume HOE. Alternatively, multiple, individual, holograms can be stacked one over the other with each hologram recording a different diffraction grating vector and, where required, a different grating period.

Similarly, multiple diffraction gratings can be stacked one over the other, each layer having a different grating vector orientation with respect to one another. Where necessary, one of the stacked diffraction gratings can have a grating period different from the periods of the other diffraction gratings in the stack.

An image light guide for conveying a virtual image in accordance with one or more other embodiments includes a waveguide having a transmissive substrate with front and back surfaces for propagating image-bearing light beams along a length of the waveguide. An in-coupling diffractive optic formed along the waveguide diffracts the image-bearing light beams from an image source into the waveguide for propagating the image-bearing light beams along the length of the waveguide in an angularly encoded form. An out-coupling diffractive optic spaced apart from the in-coupling diffractive optic along the length of the waveguide diffracts the image-bearing light beams from the waveguide in an angularly decoded form toward an eyebox for viewing the image from the image source. The out-coupling diffractive optic is formed as a diffraction lattice having a plurality of grating features in a plane defining a plurality of diffraction patterns having different orientations within the plane. Each of the grating features includes a length and width in the plane defining an aspect ratio of length to width. At least some of the grating features have an aspect ratio that departs from unity for altering diffraction efficiencies between the diffraction patterns.

The image-bearing beams approach the out-coupling diffractive optic along a nominal direction of propagation. The length of the grating features can extend along the nominal direction of propagation and the width of the grating features can extend perpendicular to the direction of propagation. In one or more embodiments, the grating features having an aspect ratio that departs from unity can have a length that exceeds their width for enhancing the efficiency of diffractions that redirect portions of the image bearing beams in directions that depart from the nominal direction of propagation. The aspect ratio of the grating features having an aspect ratio that departs from unity can vary along the nominal direction of propagation. In addition, the grating features having an aspect ratio that departs from unity can include grating features that extend contiguously along the nominal direction of propagation.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5A, 5B, 5C, 5D, and 5E show light behavior within individual grating patterns of the out-coupling diffractive optic of FIG. 4.

FIG. 6 is a table that summarizes light handling for the patterned out-coupling diffractive optic of FIG. 4.

FIG. 8A is a plan view an image light guide with a waveguide having in-coupling and out-coupling diffractive optics according to an alternate embodiment, wherein a portion of the out-coupling diffractive optic is shown in an enlarged form.

FIG. 8B is a schematic diagram showing diffraction vectors for diffractive elements of the waveguide of FIG. 8A.

FIG. 8C is a table that summarizes light handling for the patterned out-coupling diffractive optic of FIG. 8A.

FIG. 13A, FIG. 13B, and FIG. 13C depict two diffraction gratings individually and in an overlapping form.

FIG. 19 is a schematic of yet another compound grating pattern definable by the replication of a unit cell.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise.

In the context of the present disclosure, the terms "viewer", "operator", "observer", and "user" are considered equivalents and refer to the person who wears and views images using the HMD viewing device.

As used herein, the term "energizable" relates to the capability of a device or set of components upon receiving power and, optionally, upon receiving an enabling signal to perform an indicated function.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered oblique with respect to each other if they diverge from or converge toward each other at an angle that is at least about 5 degrees or more away from parallel, or at least about 5 degrees or more away from orthogonal.

The terms "coupled" or "coupler" in the context of optics refer to a connection by which light travels from one optical medium or device to another optical medium or device through an intermediate structure that facilitates the connection.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. Virtual image display has several inherent advantages for augmented reality display. For example, the apparent size of a virtual image is not limited by the size or location of a display surface. In comparison with systems that project a real image, a more realistic viewing experience can be provided by forming a virtual image that appears to be some distance away. Providing a virtual image also obviates any need to compensate for screen artifacts, as may be necessary when projecting a real image.

Figure 1:
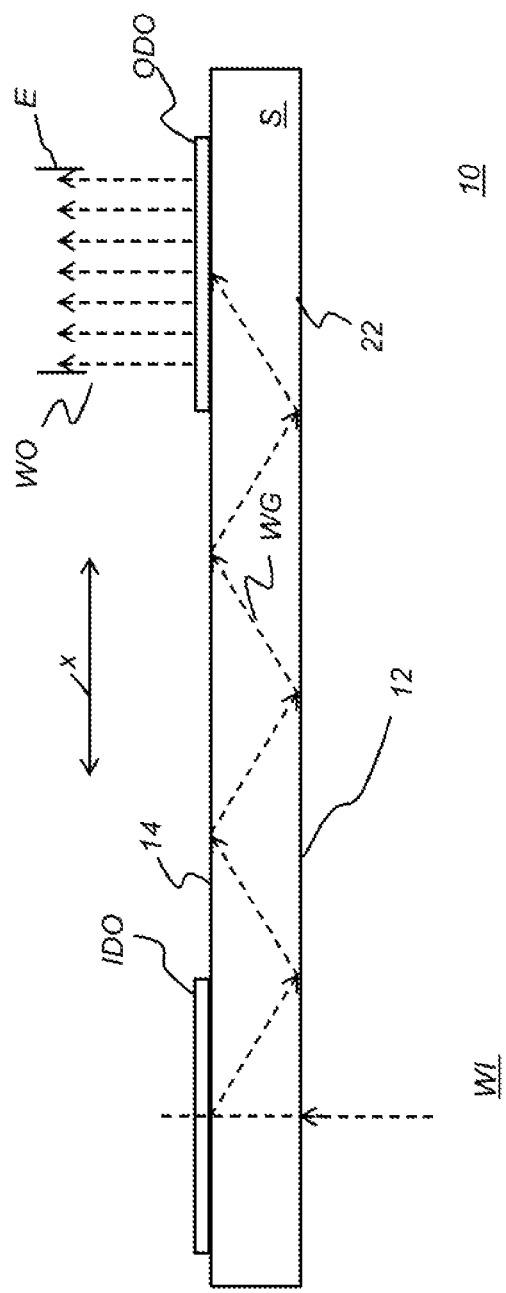
FIG. 1 is a simplified cross-sectional view of an image light guide showing the expansion of an image-bearing beam along the direction of propagation for expanding one dimension of an eyebox.

FIG. 1 is a schematic diagram showing a simplified cross-sectional view of one conventional configuration of a monocular type image light guide 10 comprising a planar waveguide 22 having plane-parallel surfaces, an in-coupling diffractive optic IDO, and an out-coupling diffractive optic ODO arranged on a transparent substrate S of the planar waveguide 22. In this example, in-coupling diffractive optic IDO is shown as a reflective type diffraction grating arranged on an inner surface 14 of the planar waveguide 22 opposite to the outer surface 12 of the planar waveguide 22 through which image-bearing light WI approaches the planar waveguide 22. However, in-coupling diffractive optic IDO could alternately be a transmissive diffraction grating, volume hologram or other holographic diffraction element, or other type of optical component that provides diffraction for the incoming, image-bearing light WI. The in-coupling diffractive optic IDO can be located on the outer or inner surface 12 or 14 of the planar waveguide 22 and can be of a transmissive or reflective type in a combination that depends upon the direction from which the image-bearing light WI approaches the planar waveguide 22.

When used as a part of a virtual display system, in-coupling diffractive optic IDO couples the image-bearing light WI from a real, virtual or hybrid image source (not shown) into the substrate S of the planar waveguide 22. Any real image or image dimension is first converted, e.g. converged toward a focus, into an array of overlapping angularly related beams encoding the different positions within a virtual image for presentation to the in-coupling diffractive optic IDO. The image-bearing light WI is diffracted (generally through a first diffraction order) and thereby redirected by in-coupling diffractive optic IDO into the planar waveguide 22 as image-bearing light WG for further propagation along the planar waveguide 22 by Total Internal Reflection (TIR). Although diffracted into a generally more condensed range of angularly related beams in keeping with the boundaries set by TIR, the image-bearing light WG preserves the image information in an encoded form. An out-coupling diffractive optic ODO receives the encoded image-bearing light WG and diffracts (also generally through a first diffraction order) the image-bearing light WG out of the planar waveguide 22 as the image-bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. However, to increase one dimension of overlap among the angularly related beams in a so-called eyebox E within which the virtual image can be seen, the out-coupling diffractive optic ODO is arranged to encounter the image-bearing light WG multiple times and to diffract only a portion of the image-bearing light WG on each encounter. The multiple encounters along the length of the out-coupling diffractive optic ODO have the effect of enlarging one dimension of each of the angularly related beams of the image-bearing light WO thereby expanding one dimension of the eyebox E within which the beams overlap. The expanded eyebox E decreases sensitivity to the position of a viewer's eye for viewing the virtual image.

The out-coupling diffractive optic ODO is shown as a transmissive type diffraction grating arranged on the inner surface 14 of the planar waveguide 22. However, like the in-coupling diffractive optic IDO, the out-coupling diffractive optic ODO can be located on the outer or inner surface 12 or 14 of the planar waveguide 22 and be of a transmissive or reflective type in a combination that depends upon the direction through which the image-bearing light WG is intended to exit the planar waveguide 22.

Figure 2:
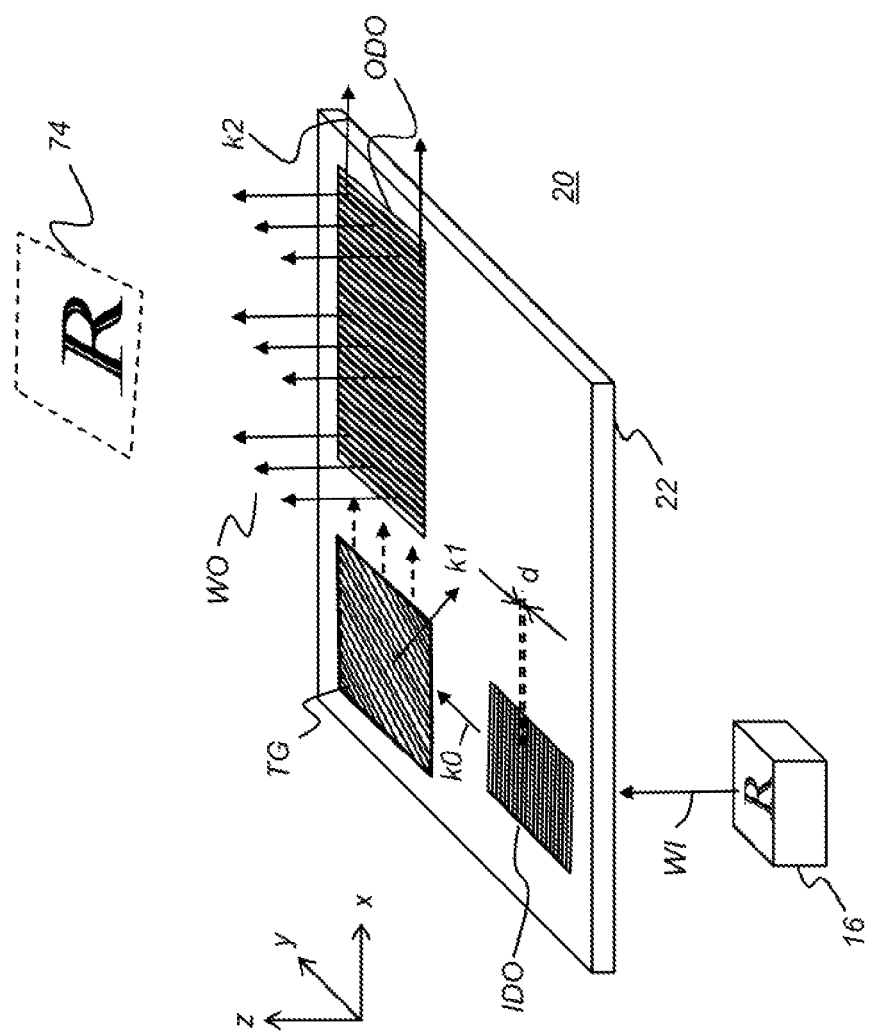
FIG. 2 is a perspective view of an image light guide with a turning grating showing the expansion of an image-bearing beam perpendicular to the direction of propagation for expanding a second dimension of an eyebox.

The perspective view of FIG. 2 shows an image light guide 20 that is arranged for expanding the eyebox 74 in two dimensions, i.e., along both x- and y-axes of the intended image. To achieve a second dimension of beam expansion, the in-coupling diffractive optic IDO is oriented to diffract the image-bearing light WG about a grating vector k0 toward an intermediate turning grating TG, whose grating vector k1 is oriented to diffract the image-bearing light WG in a reflective mode toward the out-coupling diffractive optic ODO. Only a portion of the image-bearing light WG is diffracted by each of multiple encounters with intermediate turning grating TG thereby laterally expanding each of the angularly related beams of the image-bearing light WG approaching the out-coupling diffractive optic ODO. The turning grating TG redirects the image-bearing light WG into an at least approximate alignment with a grating vector k2 of the out-coupling diffractive optic ODO for longitudinally expanding the angularly related beams of the image-bearing light WG in a second dimension before exiting the planar waveguide 22 as the image-bearing light WO. Grating vectors, such as the depicted grating vectors k0, k1, and k2, extend in a direction that is normal to the diffractive features (e.g., grooves, lines, or rulings) of the diffractive optics and have a magnitude inverse to the period or pitch d (i.e., the on-center distance between grooves) of the diffractive optics IDO, TG, and ODO.

In the image light guide 20 of FIG. 2, in-coupling diffractive optic IDO receives the incoming image-bearing light WI containing a set of angularly related beams corresponding to individual pixels or equivalent locations within an image generated by an image source 16. A full range of angularly encoded beams for producing a virtual image can be generated by a real display together with focusing optics, by a beam scanner for more directly setting the angles of the beams, or by a combination such as a one-dimensional real display used with a scanner. The image light guide 20 outputs an expanded set of angularly related beams in two dimensions of the image by providing multiple encounters of the image-bearing light WG with both the intermediate turning grating TG and the out-coupling diffractive optic ODO in different orientations. In the original orientation of the planar waveguide 22, the intermediate grating TG provides beam expansion in the y-axis direction, and the out-coupling diffractive optic ODO provides a similar beam expansion in the x-axis direction. The reflectivity characteristics and respective periods d of the two diffractive optics IDO and ODO and the intermediate grating TG, together with the orientations of their respective grating vectors, provide for beam expansion in two dimensions while preserving the intended relationships among the angularly related beams of the image-bearing light WI that are output from the image light guide 20 as the image-bearing light WO.

That is, while the image-bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The turning grating TG, located in an intermediate position between the in-coupling and out-coupling diffractive optics IDO and ODO, is typically arranged so that it does not induce any significant change on the encoding of the image-bearing light WG. The out-coupling diffractive optic ODO is typically arranged in a symmetric fashion with respect to the in-coupling diffractive optic IDO, e.g., including diffractive features sharing the same period. Similarly, the period of the turning grating TG also typically matches the common period of the in-coupling and out-coupling diffractive optics IDO and ODO. Although the grating vector k1 of the turning grating is shown oriented at 45 degrees with respect to the other grating vectors (all as undirected line segments), which remains a possible orientation, the grating vector k1 of the turning grating TG is preferably oriented at 60 degrees to the grating vectors k0 and k2 of the in-coupling and out-coupling diffractive optics IDO and ODO in such a way that the image-bearing light WG is turned 120 degrees. By orienting the grating vector k1 of the intermediate turning grating at 60 degrees with respect to the grating vectors k0 and k2 of both the in-coupling and out-coupling diffractive optics IDO and ODO, the grating vectors k0 and k2 of the in-coupling and out-coupling diffractive optics IDO and ODO are also oriented at 60 degrees with respect to each other (again considers as undirected line segments). Basing the grating vector magnitudes on the common pitch of the turning grating TG and the in-coupling and out-coupling diffractive optics IDO and ODO, the three grating vectors k0, k1, and k2 (as directed line segments) form an equilateral triangle, and sum to a zero-vector magnitude, which avoids asymmetric effects that could introduce unwanted aberrations including chromatic dispersion.

The image-bearing light WI that is diffracted into the planar waveguide 22 is effectively encoded by the in-coupling optic, whether the in-coupling optic uses gratings, holograms, prisms, mirrors, or some other mechanism. Any reflection, refraction, and/or diffraction of light that takes place at the input must be correspondingly decoded by the output to re-form the virtual image that is presented to the viewer. Preferably, the turning grating TG, placed at an intermediate position between the in-coupling and out-coupling diffractive optics IDO and ODO, is typically designed and oriented so that it does not induce any change on the encoded light. Out-coupling diffractive optic ODO decodes the image-bearing light WG into its original or desired form of angularly related beams that have been expanded to fill the eyebox 74. In a broader sense, whether any symmetries are maintained or not among the turning grating TG and the in-coupling and out-coupling diffractive optics IDO and ODO or whether or not any change to the encoding of the angularly related beams of the image-bearing light WI takes place along the planar waveguide 22, the turning grating TG and the in-coupling and out-coupling diffractive optics IDO and ODO are related so that the image-bearing light WO that is output from the planar waveguide 22 preserves or otherwise maintains the original or desired form of the image-bearing light WI for producing the intended virtual image.

The letter "R" represents the orientation of the virtual image that is visible to the viewer whose eye is in the eyebox 74. As shown, the orientation of the letter "R" in the represented virtual image matches the orientation of the letter "R" as encoded by the image-bearing light WI. A change in the rotation about the z axis or angular orientation of incoming image-bearing light WI with respect to the x-y plane causes a corresponding symmetric change in rotation or angular orientation of outgoing light from out-coupling diffractive optic (ODO). From the aspect of image orientation, the turning grating TG simply acts as a type of optical relay, providing expansion of the angularly encoded beams of the image-bearing light WG along one axis (e.g., along the y axis) of the image. Out-coupling diffractive optic ODO further expands the angularly encoded beams of the image-bearing light WG along another axis (e.g., along the x axis) of the image while maintaining the original orientation of the virtual image encoded by the image-bearing light WI. The turning grating TG is typically a slanted or square grating or, alternately, can be a blazed grating and is typically arranged on the front or back surfaces of the planar waveguide 22.

The image light guides 10 and 20 depicted in FIGS. 1 and 2 can be of a type used in many existing head-mounted device (HMD) designs for providing image content to a viewer. This type of image light guide is particularly well suited to augmented reality applications in which virtual image content can be superimposed on a real-world view as seen through the transparent planar waveguide 22.

The conventional image light guide 20 that is shown in FIGS. 1 and 2 is used in many existing head-mounted device (HMD) designs for providing image content to a viewer. This type of light guide is particularly well suited to augmented reality applications in which image content can be superimposed on a real-world view as seen through the transparent image light guide.

An embodiment of the present disclosure provides improved waveguide performance and eliminates the need for a separate turning grating TG in the light path by using a diffractive array that expands each of the image-bearing light beams in both x and y directions and outputs the expanded image-bearing beams toward an eyebox.

Figure 3:
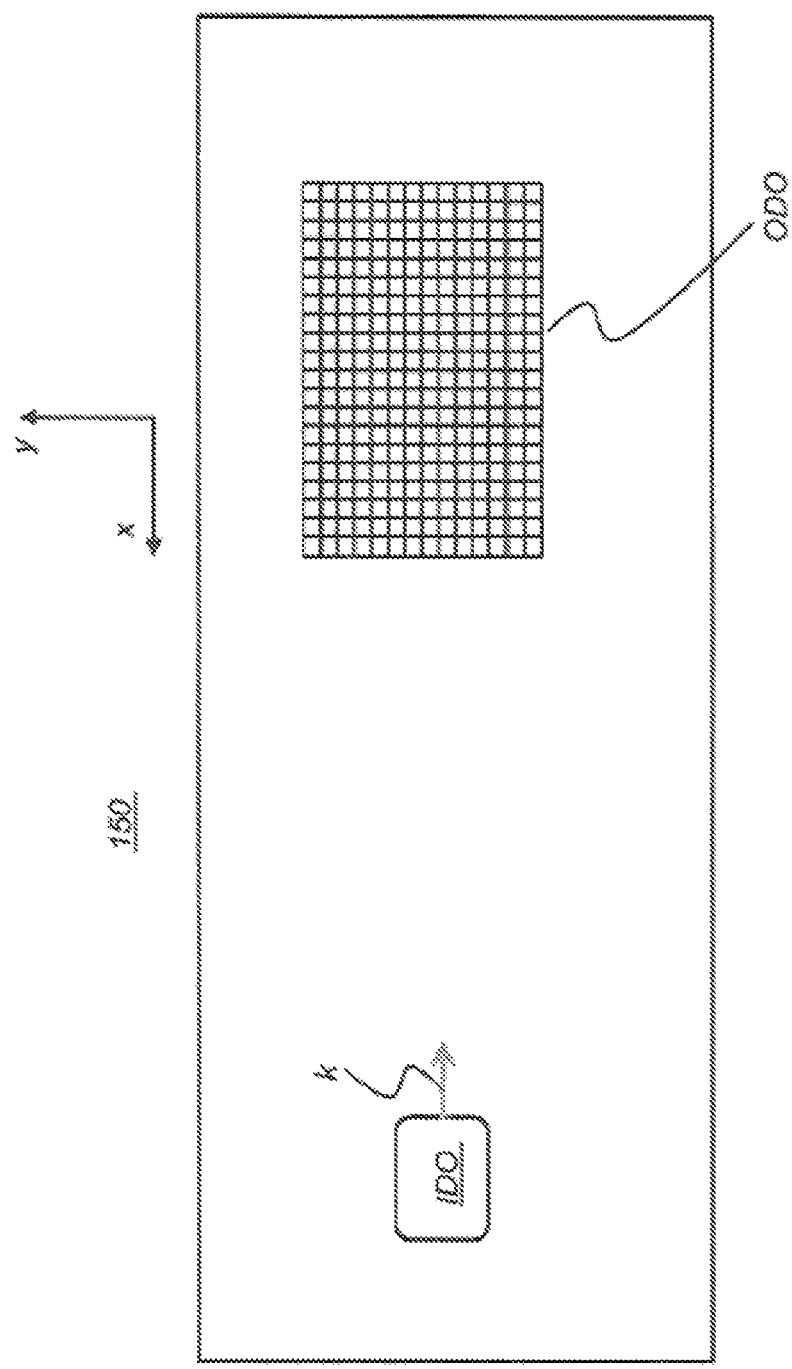
FIG. 3 is a plan view of an image light guide showing a waveguide having an in-coupling diffractive optic and out-coupling diffractive optic both formed on the same surface of the waveguide.

Referring to FIG. 3, there is shown a waveguide as an image light guide 150 having in-coupling diffractive optic IDO and out-coupling diffractive optic ODO, both IDO and ODO that can be formed on the same surface of waveguide 150. Alternately, IDO and ODO can be formed on the different surfaces of waveguide 150. In-coupling diffractive optic IDO has the grating vector k extending in the x direction, as shown. Out-coupling diffractive optic ODO has multiple grating vectors that are not parallel to grating vector k, as shown subsequently.

Figure 4:
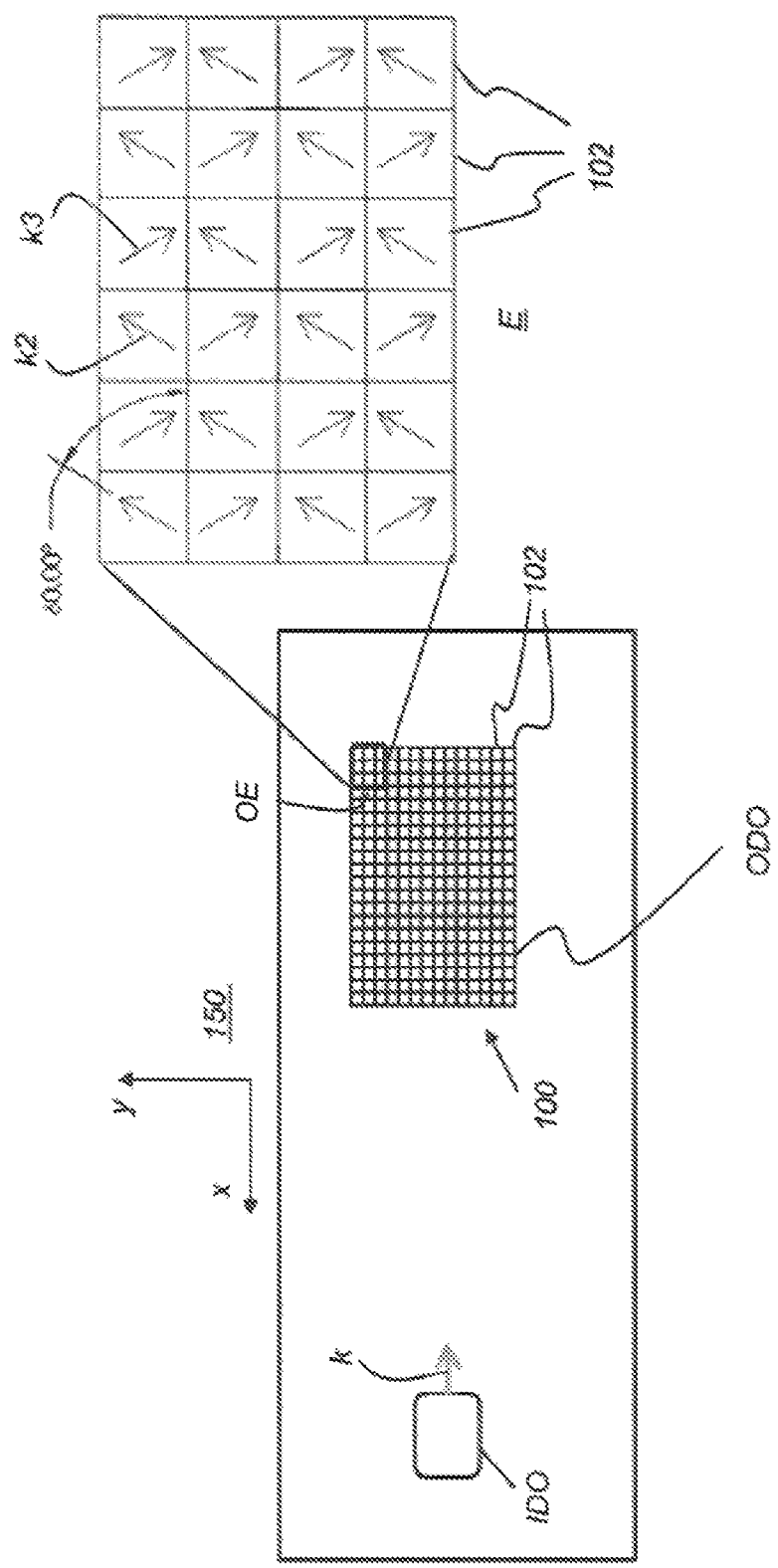
FIG. 4 is a plan view showing an enlarged portion of the out-coupling diffractive optic with a pattern of alternating grating vectors.

The plan view of FIG. 4 shows an arrangement of out-coupling diffractive optic ODO as a diffractive array 100. Array 100 has multiple component diffractive optical elements or optics 102. In a row of the array 100, sequential diffractive optical elements 102 have alternating grating vectors k2 and k3. The alternating grating vector arrangement is schematically shown for a portion of array 100 in an enlarged view OE. Grating vectors k2 are offset from input grating vector k and from axis x by +60 degrees (alternately, offset from axis y by −30 degrees). Grating vectors k3 are offset from input grating vector k and axis x by −60 degrees.

Diffractive array 100, used in the light path as out-coupling diffractive optic in FIG. 4 and subsequent embodiments, can be considered structurally formed as the union of disjoint, mutually non-overlapping subsets of diffractive elements or optics formed on a single surface. Considered in terms of set theory, this union of subsets forms a "partition". There is a unique grating vector corresponding to each subset of the partition and the subsets are distinguished from each other according to the grating vector direction. That is, all the diffractive elements in each subset have a common grating vector. In the spatial arrangement of diffractive elements 102, elements of at least two subsets alternate with each other, so that each element from the subset with grating vector k2 is immediately adjacent to one or more neighboring elements from the other subset with grating vector k3. More than two subsets of immediately adjacent elements can be used to constitute the partition of diffractive array 100; each subset has a grating vector that extends in a different direction from the corresponding grating vector for any other subset.

Figure 5C:
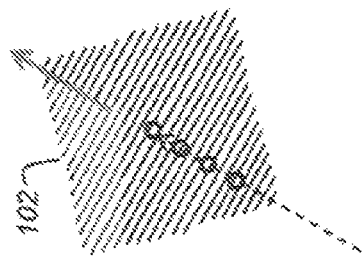
Figure 5A:
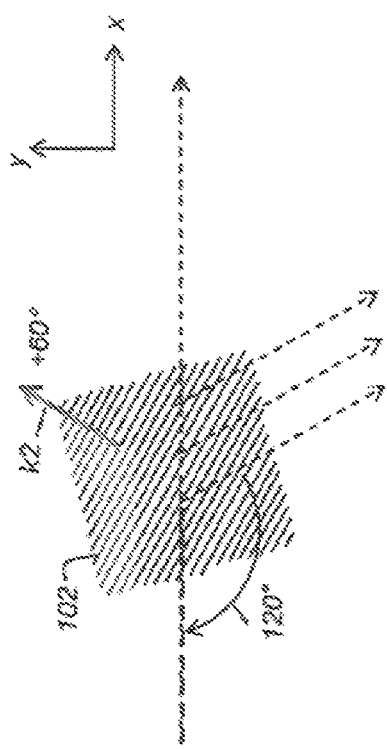

The schematic views of FIGS. 5A through 5E show how this arrangement using alternating grating vectors operates at individual diffractive elements 102 to distribute and output light for forming a virtual image. FIG. 5A shows how light incident from IDO, traveling toward the left in the depiction shown, interacts over a portion of diffractive element 102 that is formed having grating vector k2. Some portion of the incident light is diffracted at optic 102 and thereby deflected 120 degrees from the original path of light from IDO. A percentage of this light is diffracted and redirected, to other portions of array 100, at each of several points along the diffraction grating. Another portion of this light is not diffracted, but instead travels through the diffractive optical element 102 to the next optical element 102 in sequence.

Figure 5B:
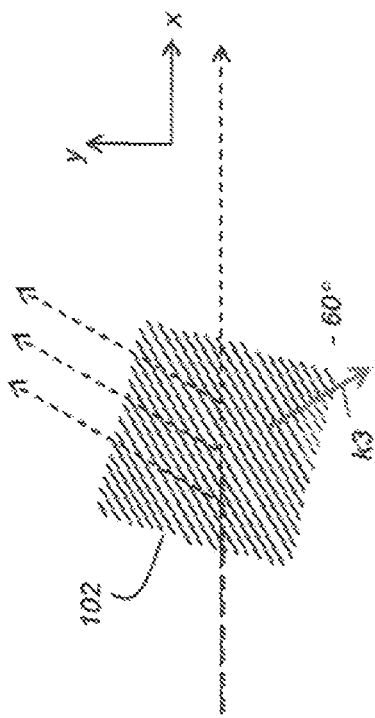

FIG. 5B shows a similar path to that described for FIG. 5A, but in the inverse direction. Incident light from IDO that is conveyed to diffractive element 102 having grating vector k3 can take either of the angular paths shown. Some portion of the incident light is diffracted at optical element 102 and deflected −120 degrees from the original path of light from IDO. A percentage of this light is diffracted and redirected, to other portions of array 100, at each of several points along the diffraction grating. Another portion of this light is not diffracted, but instead travels through the diffractive element 102 and to the next element 102 in sequence.

FIG. 5C shows what happens when light is incident at an angle that is substantially orthogonal to the gratings of diffractive element 102. At this angle, the light exits from diffractive element 102, with some portion of the light directed outward at each interaction with the diffractive structures.

FIG. 5D shows one type of interaction that causes light to be output from array 100. Some of the light diffracted from element 102 having grating vector k2 can be incident on another optical element 102 further into the array 100 and having grating vector k3. The condition shown in FIG. 5C is satisfied, with light incidence parallel to the grating vector. This light is then output (that is, output from the page in the view of FIG. 5D).

FIG. 5E shows a different interaction that can occur along the light path within array 100. Here, some of the light diffracted from optical element 102 having grating vector k2 can be incident on another element 102 further into the array 100 also having grating vector k2. The resulting output light is directed outward, parallel to the input light in the arrangement shown.

FIG. 6 shows Table 1 that summarizes the predominant light response for each diffractive element 102 of a diffractive array 100. From the description related to FIGS. 5A-6 numerous potential paths are provided for incident light within diffractive array 100, allowing the light to be spread along both x and y axis directions for providing an expanded output. However, not all the light incident at a particular angle is redirected as shown in FIG. 6. Light that is not redirected at first contact with the grating can continue through the grating, to be redirected at any number of additional points along the grating. FIG. 6 shows the predominant path for light that will form the viewer image.

Figure 7A:
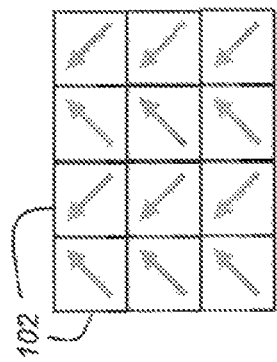
FIGS. 7A, 7B, and 7C show different geometrical arrangements of the subsets of diffractive elements that are combined to form a diffractive array according to embodiments of the present disclosure.
Figure 7B:
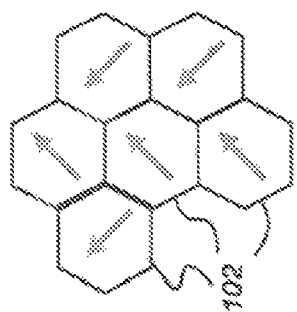
Figure 7C:
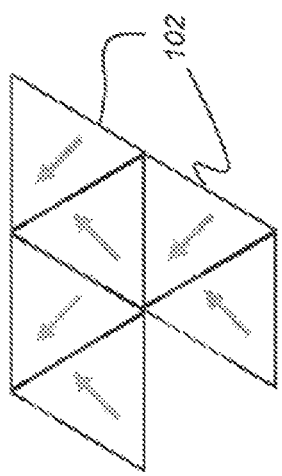

There are many shape arrangements for diffractive elements 102, depending on factors such as needed performance and manufacturability. The embodiment of FIG. 7A shows an enlarged portion of a checkerboard configuration, using rectangular elements 102 arranged with grating vectors k2, k3 alternating along each row and along each column of the array 100. FIG. 7B shows an enlarged portion of an arrangement using hexagons. FIG. 7C shows an enlarged portion of an arrangement using triangles. For each of these arrangements, the diffractive elements 102 are of either a first subset having a grating vector that is offset from the grating vector of the IDO by about +60 degrees (that is, offset by an angle within +60+/−3 degrees), or a second subset having a grating vector that is offset from the grating vector of the IDO by about −60 degrees (that is, offset by an angle within −60+/−3 degrees). Each diffractive element of the first (+60 degree) subset is immediately adjacent to at least one diffractive element of the second (−60 degree) subset. The diffractive elements of the first and second subsets are mutually non-overlapping.

Design parameters such as gratings depth and other features can be varied across the grating, such as to selectively output higher percentages of light toward extreme portions of out-coupling diffractive optic, for example.

In addition to shape modification, other changes to the basic model of FIG. 4 can include using, within diffractive array 100, some number of additional grating elements of a subset having grating vectors at angles other than +/−60 degrees. According to an embodiment of the present invention, some amount of randomization can be provided, including use of gratings at 0 degrees or at some other suitable angle, selectively interspersed in the light path extending along the array 100.

FIG. 8A and the enlarged schematic view of FIG. 8B show an image light guide 170 having in-coupling and out-coupling diffractive optics on the same side of the waveguide substrate according to an alternate embodiment of the present disclosure. In the configuration shown out-coupling diffractive optic ODO is formed of groupings of three diffractive elements, immediately adjacent to each other and having three corresponding grating vectors k, k2, and k3 as shown in FIG. 8B. The table in FIG. 8C shows light handling behavior for light traveling at different angles within the image light guide 170. Grating vector k is about 60 degrees (60 degrees+/−3 degrees) from either grating vectors k2 and k3.

Advantageously, the embodiment shown in FIGS. 4 and 8A provides a waveguide that provides beam expansion without requiring turning gratings. Light distribution, however, can be improved using additional distribution gratings, as shown in the exemplary embodiments of FIGS. 9A, 9B, and 10.

Figure 9A:
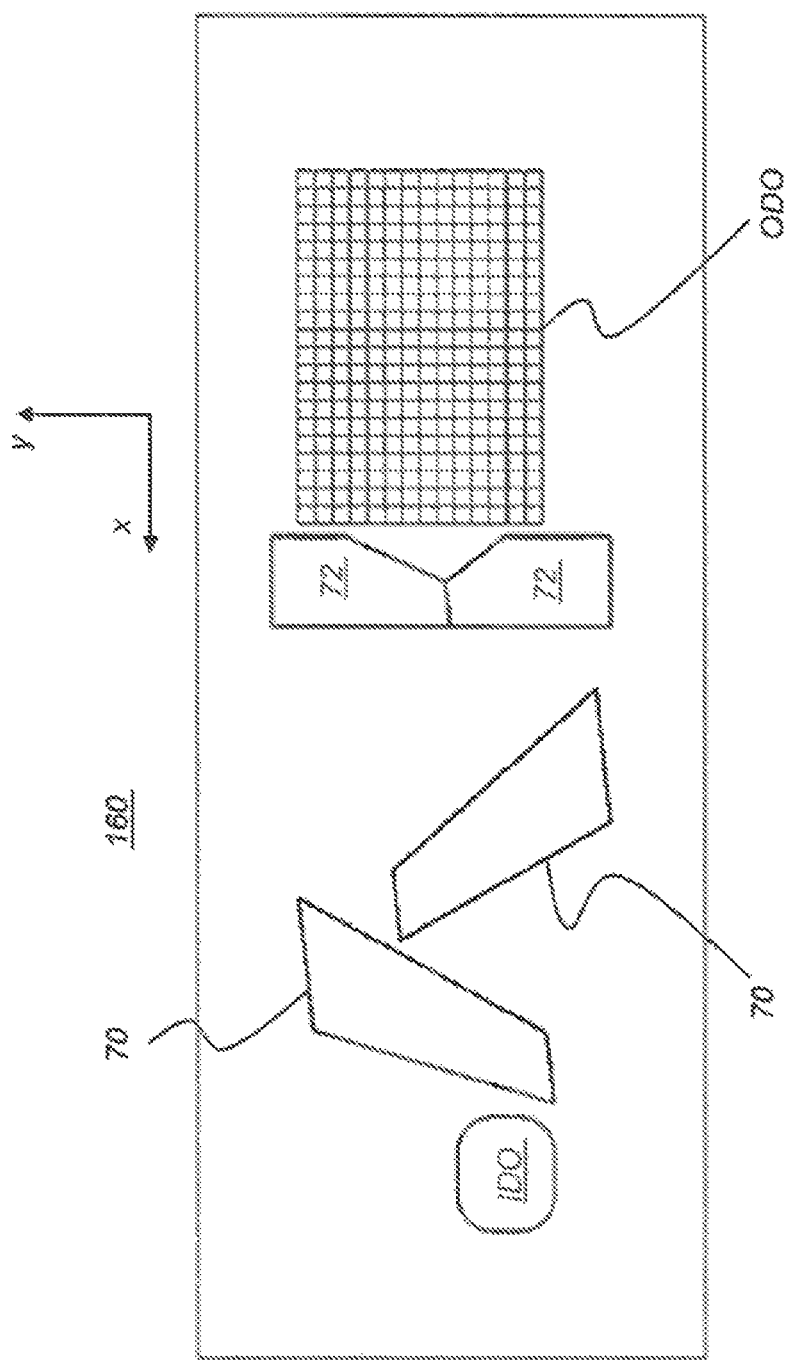
FIG. 9A is a plan view of an image light guide having an arrangement of distribution gratings along a waveguide according to an embodiment of the present disclosure.
Figure 9B:
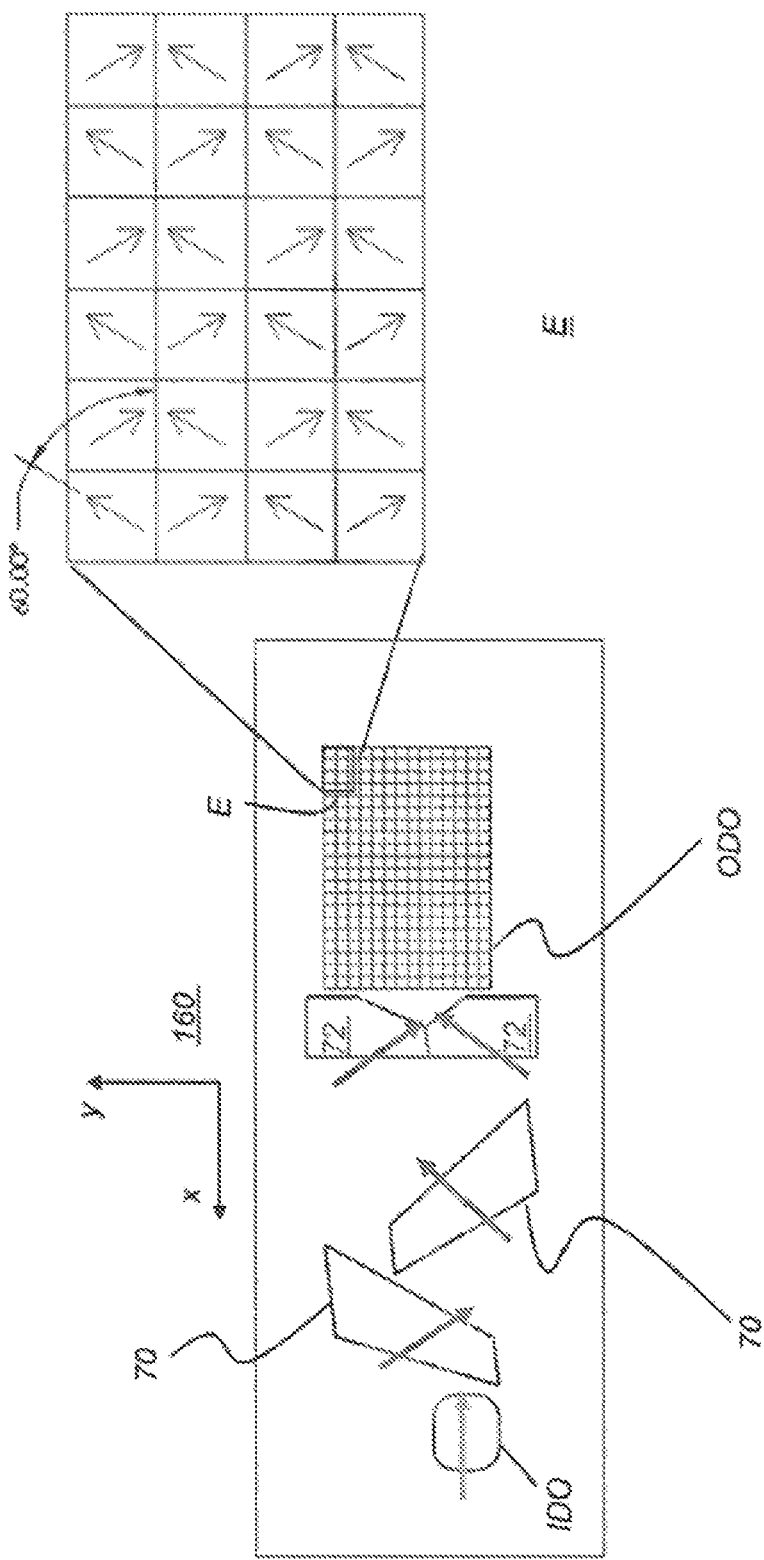
FIG. 9B is a similar plan view showing the gratings vectors of the distribution gratings of FIG. 9A, including grating vectors within an enlarged portion of the out-coupling diffractive optic.

The plan view of FIG. 9A shows a waveguide that provides an image light guide 160 using an arrangement of diffractive optics to form an expanded output beam from the waveguide. Light from in-coupling diffractive optic IDO is directed to first and second distribution gratings 70 for expansion with respect to the y dimension shown. The resulting light is then redirected into out-coupling diffractive optic ODO by paired distribution gratings 72. Out-coupling diffractive optic ODO uses diffractive array 100 as described previously. FIG. 9B shows representative grating vectors for the different diffractive components of the image light guide 160.

Figure 10:
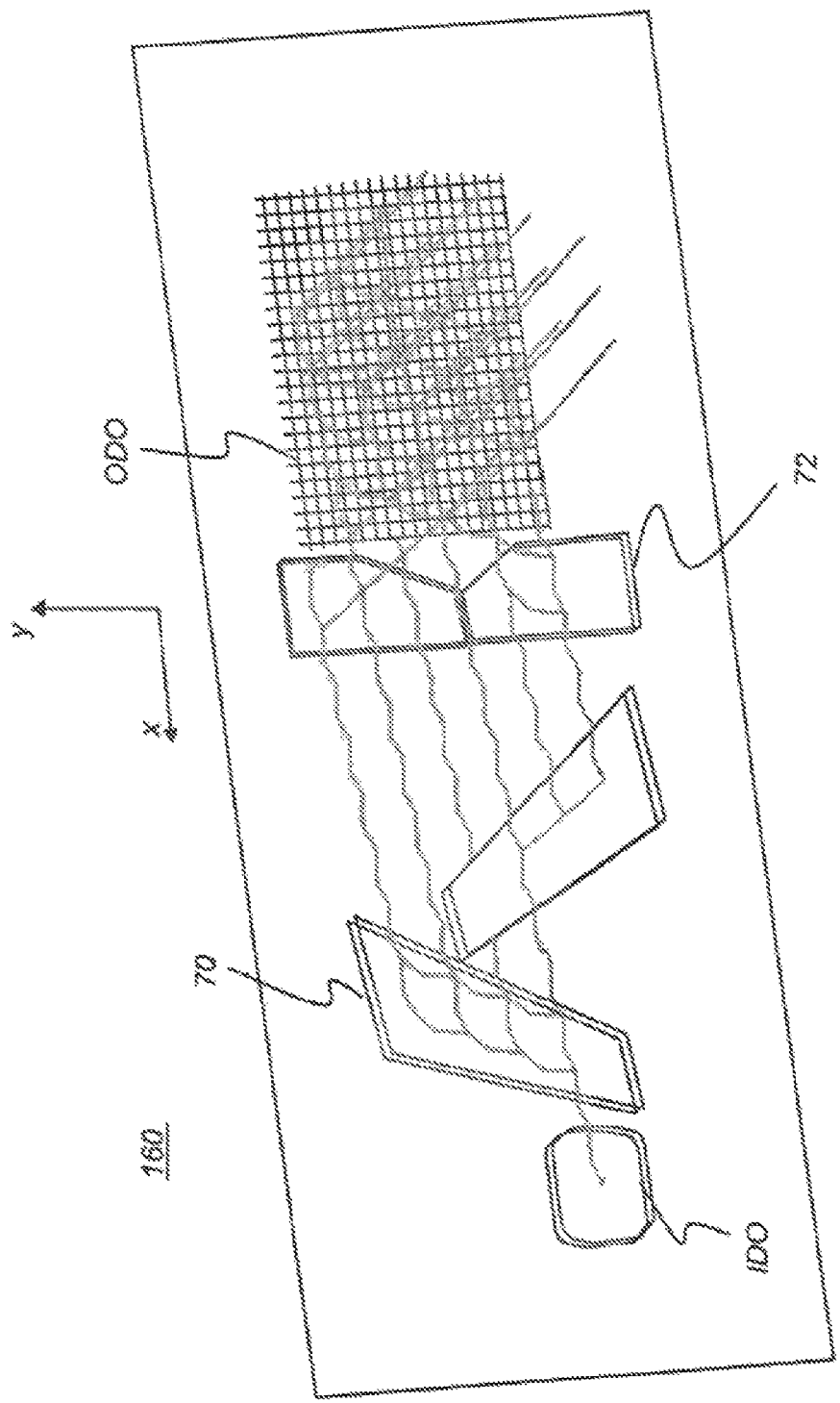
FIG. 10 is a perspective view showing light paths within the image light guide of FIGS. 9A and 9B.

FIG. 10 shows a schematic view of light distribution paths that are defined for image-bearing light directed to in-coupling diffractive output IDO by light guide 160 of FIGS. 8 and 9. Light from in-coupling diffractive output IDO is expanded along the direction of the y-axis, with the light path directed through one or both distribution gratings 70. Light from each distribution grating 70 is then conveyed to the second pair of distribution gratings 72. Distribution gratings 72 redirect the light internally, but do this to spread the beam, redirecting the light in the direction of the output light path, toward out-coupling diffraction grating ODO. Out-coupling diffraction grating ODO then directs the light orthogonally out of the image light guide 160 to form a viewer eyebox. Thus, the path of image-bearing light can be directed through at least two distribution gratings, wherein the distribution gratings are spaced apart from each other and expand the image-bearing light within the image light guide.

Pass-through light that proceeds along the light path from grating 70 to the subsequent distribution grating 72 is light that has been diffracted an even number of times. Expansion of the light with respect to the y axis is a result of odd-numbered diffractions {1, 3, 5, etc. . . . . ]}.

Figure 11:
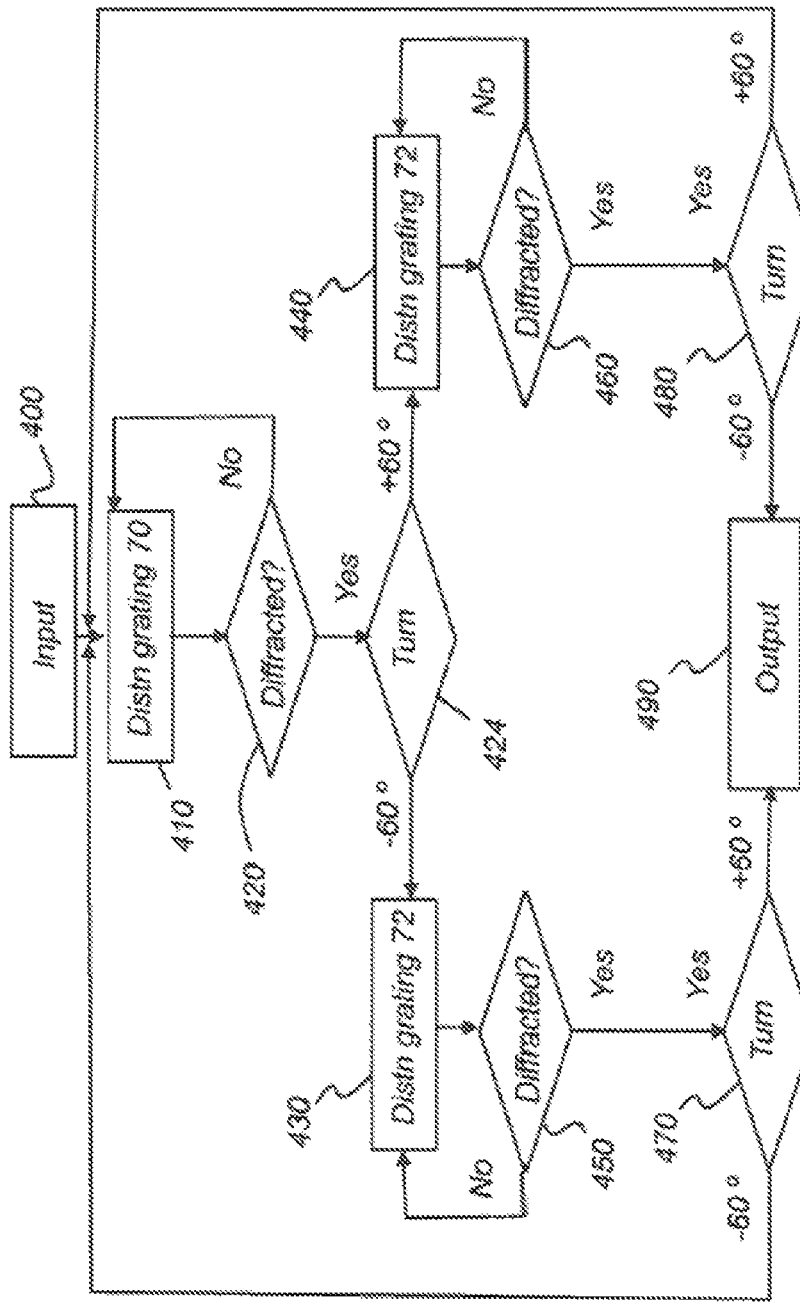
FIG. 11 is a flow diagram of light processing and distribution within an image light guide according to an embodiment of the present disclosure.

The flow chart shown in FIG. 11 describes how image light guide 150 handles light with the arrangement of gratings shown in FIGS. 8-10. In an input step 400, light is input to in-coupling diffractive optic IDO. The light proceeds to distribution grating 70 in step 410. In step 420, diffracted light from grating 70 then proceeds to a turn step 424, wherein the light is turned to either +60 degrees or −60 degrees. Light turned −60 degrees proceeds to a diffraction step 430 in diffraction grating 72. Undiffracted light is cycled in step 450. Diffracted light proceeds to a turn step 470 and is redirected at either +/−60 degrees. Similarly, light turned +60 degrees proceeds to a diffraction step 440 in diffraction grating 72. Undiffracted light is cycled in step 460. Diffracted light proceeds to a turn step 480 and is redirected at either +/−60 degrees. Light is output from out-coupling diffractive optic ODO in an output step 490. It should be noted that FIG. 11 identifies the predominant light path, approximating the light handling behavior for much of the light within the image light guide. Not all the light undergoes diffraction at various interfaces, for example.

Figure 12:
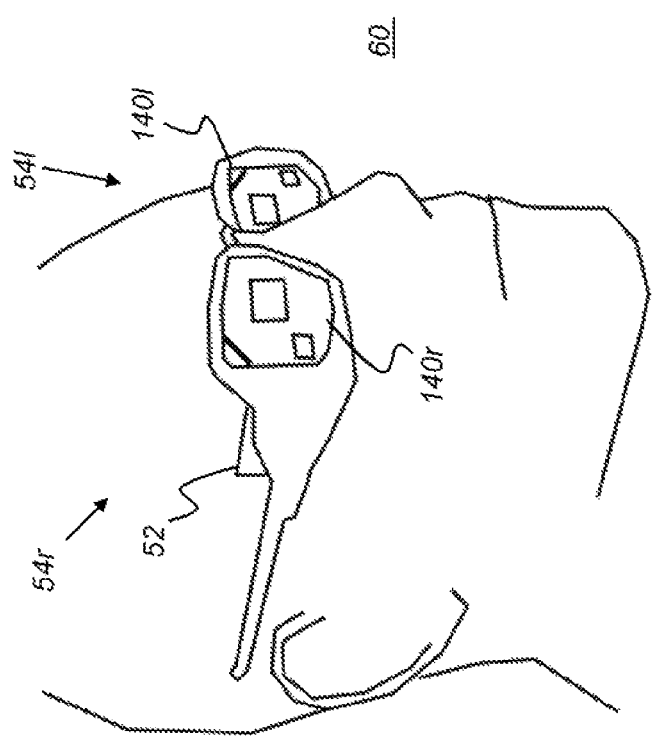
FIG. 12 is a perspective view showing a display system for augmented reality viewing using image light guides of the present disclosure.

The perspective view of FIG. 12 shows a display system 60 for three-dimensional (3-D) augmented reality viewing using a pair of image light guides of the present disclosure. Display system 60 is shown as an HMD with a left-eye optical system 54l having an image light guide 140l for the left eye and a corresponding right-eye optical system 54r having an image light guide 140r for the right eye. An image source 52, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

FIG. 13A is a schematic of a diffraction grating 500 having a grating vector k1 and a grating period d1 defining a first grating pattern. In one embodiment, gating vector k1 has an angle of 45 degrees with respect to the x-direction. In another arrangement, grating vector k1 has an angle of approximately 60 degrees with respect to the x-direction. In yet another arrangement, grating vector k1 has an angle of approximately 30 degrees with respect to the x-direction.

FIG. 13B is a schematic of a diffraction grating 510 having a grating vector k2 and a period d2 defining a second grating pattern. In one arrangement, gating vector k2 has an angle of −45 degrees with respect to the x-direction. In another arrangement, grating vector k2 has an angle of approximately −60 degrees with respect to the x direction. In another arrangement, grating vector k2 has an angle of approximately −30 degrees with respect to the x-direction.

FIG. 13C is a schematic of an overlapped diffraction grating 520 composed of overlapping diffraction grating 500 and diffraction grating 510. In one arrangement, the angular relation between grating vectors k1 and k2 is 45 degrees. In another arrangement, the angular relation between grating vectors k1 and k2 is approximately 60 degrees. In another arrangement, the angular relation between grating vectors k1 and k2 is approximately 30 degrees. In another arrangement, the angular relation between grating vector k1 and grating vector k2 is between 0 and 180 degrees.

In one arrangement, the period d1 of the first diffraction grating is the same as the period d2 of the second diffraction grating. In another arrangement, the period d1 of the first diffraction grating is different from the period d2 of the second diffraction grating. In one arrangement (not shown), at least one of the diffraction patterns has a chirped period that changes in the direction of the grating vector.

Conical diffraction rules encompass arbitrary angles of incidence, including angle of incidence having an azimuthal component out of the plane that is normal to the grating and includes the grating vector. A mathematical description of these rules formulated for direction cosine space is provided in a paper entitled "Description of Diffraction Grating Behavior in Direction Cosine Space" by James E. Harvey, and Cynthia L. Vernold, Applied Optics, Vol. 37, Iss. 34, pp. 8158-8160 (1998), which paper is hereby incorporated by reference.

For purposes of defining conical diffractions, a right-handed coordinate system can be centered on the intersection point of the input ray vector with the plane of the grating, such that the grating's normal vector is along the z-axis, the x-axis is along the input ray's vector projected onto the xy-plane. Then the x- and y-coordinates of the $m^{th}$ order diffracted ray projected onto the xy-plane are given by the equations:

$$x_m = \left(\frac{m\lambda}{d}\right)\cos(\kappa) - [\sin(\theta_{in})\cos(\phi_{in})],$$

$$y_m = \left(\frac{m\lambda}{d}\right)\sin(\kappa) - [\sin(\theta_{in})\sin(\phi_{in})],$$

where m=0, ±1, ±2, . . . indicates the diffraction order, $\lambda=\lambda_0/n_{in}$ is the wavelength in the material that the light ray is traveling through, the material having an index of refraction $n_{in}$, and with $\lambda_0$ being the wavelength of the light ray in vacuum, d is the grating's pitch, κ (Greek letter kappa) being the angle of the grating vector k with respect to the positive x-axis direction, $\theta_{in}$ is the polar angle that the incident ray makes with respect to the z-axis (the grating's normal), and $\phi_{in}$ is the azimuth angle that the projection of the incident ray makes with respect to the x-axis in the xy-plane. For the case that the incident ray is in the xz-plane, coming from the −x-axis toward the +x-axis direction, the azimuth angle will be $\phi_{in}=0°$.

The condition that $$r^2 \equiv x_m^2 + y_m^2 \le 1,$$

ensures that the diffracted ray is real (as opposed to an evanescent ray).

Then, the azimuth angle in the xy-plane, with respect to the x-axis, for the $m^{th}$ order diffracted ray is determined by:

$$\phi_{out} = \arccos\left(\frac{x_m}{r}\right).$$

In this way, the turning of the diffracted ray can be determined. The polar angle that the $m^{th}$ order diffracted ray makes with the z-axis is determined by:

$$\theta_{out} = \arcsin(r).$$

These equations may be used to determine a first order design of linear crossed gratings by considering the multiple crossed grating vectors individually as non-crossed gratings. Because other, secondary, grating vectors may occur when designing crossed gratings, additional adjustment of the design, based in part on experimentation, and/or a more rigorous Fourier analysis of the completed cross grating, may be desired for a particular application of the crossed gratings being considered.

Figure 14:
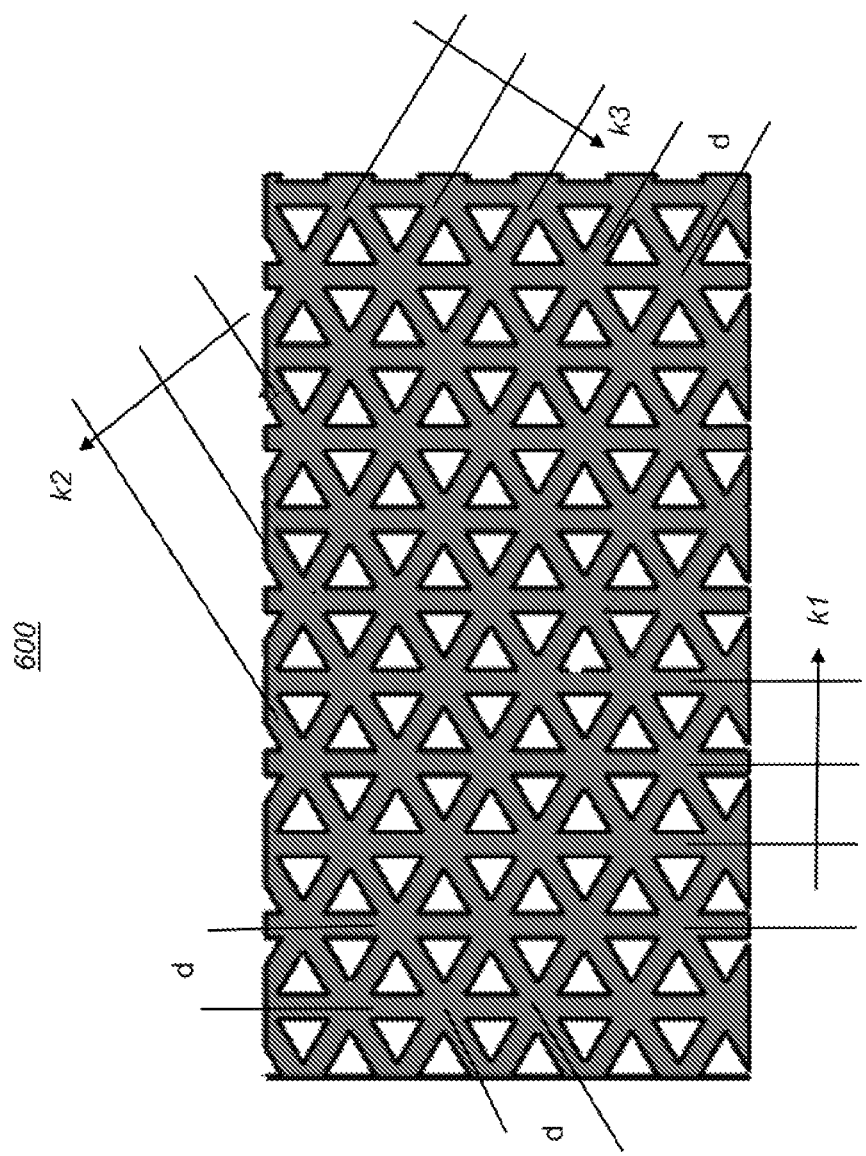
FIG. 14 is a schematic plan view of a compound diffraction grating according to an embodiment of the present disclosure.

FIG. 14 is a schematic of a compound diffraction grating 600 that is composed of three overlapping gratings. As a compound grating, the three gratings overlap in the same plane. The separate diffraction gratings are demarcated by three grating vectors k1, k2, and k3, defining three different grating patterns. The period d of each of the three gratings is the same value. In other arrangements, the three grating periods are not all the same. In addition, at least one of the three grating periods can have a chirped period. As shown, all three grating vectors k1, k2, and k2 are related by angles of 60 degrees (when considered as undirected line segments). Basing the grating vector magnitudes on a common pitch, the three grating vectors k1, k2, and k3 (as directed line segments) form an equilateral triangle and sum to a zero magnitude. In other arrangements, the grating vectors can be relatively oriented by different angular amounts. For example, in an arrangement in which the image-bearing beams approach the compound diffraction grating in a nominal direction of propagation in alignment with the grating vector k1, the grating vectors k2 and k3 could be oriented with respect to the grating vector k1 by angles of 45 degrees.

Figure 15:
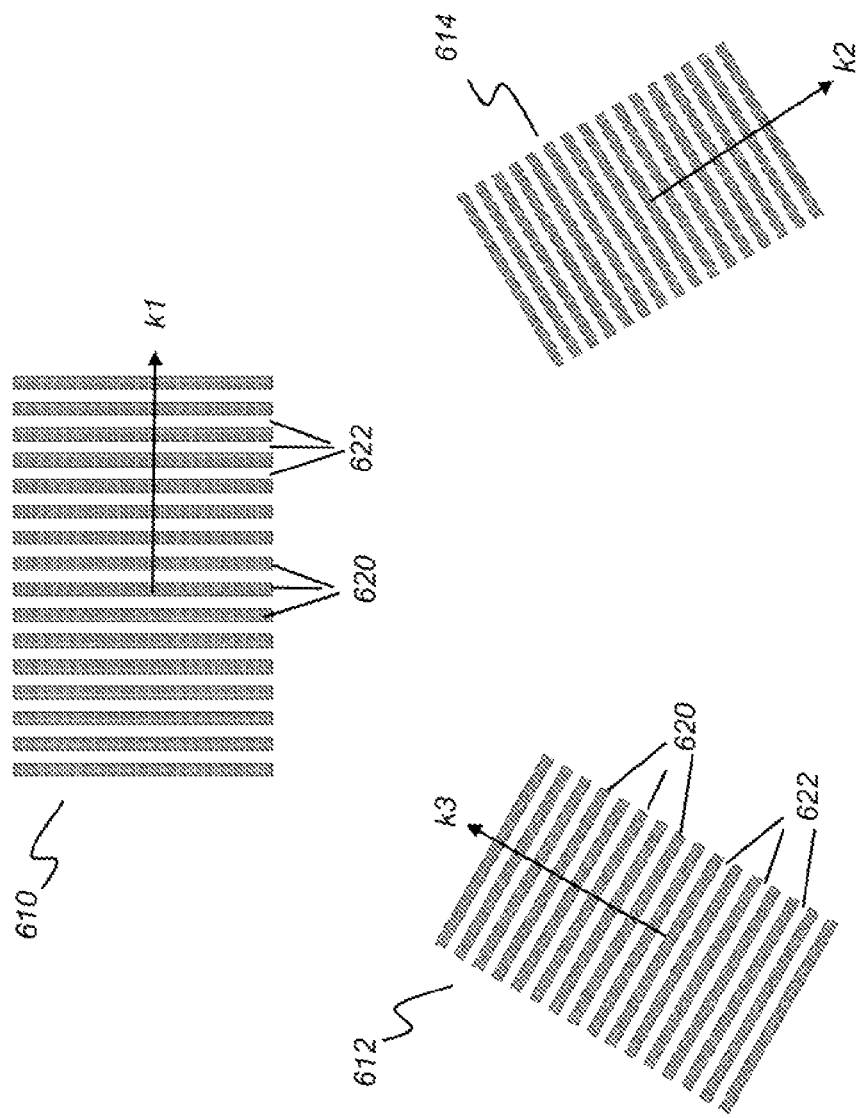
FIG. 15 is a schematic of three gratings patterns having different orientations with respect to one another.

FIG. 15 is a schematic of three diffraction grating patterns 610, 612, 614 each oriented at a different angle from one another like the grating patterns of FIG. 14. In a binary arrangement, the darkened bars 620 represent the removal of material and the white spaces 622 between the darkened bars 620 represent original material from which a compound diffraction grating can be made.

Figure 16:
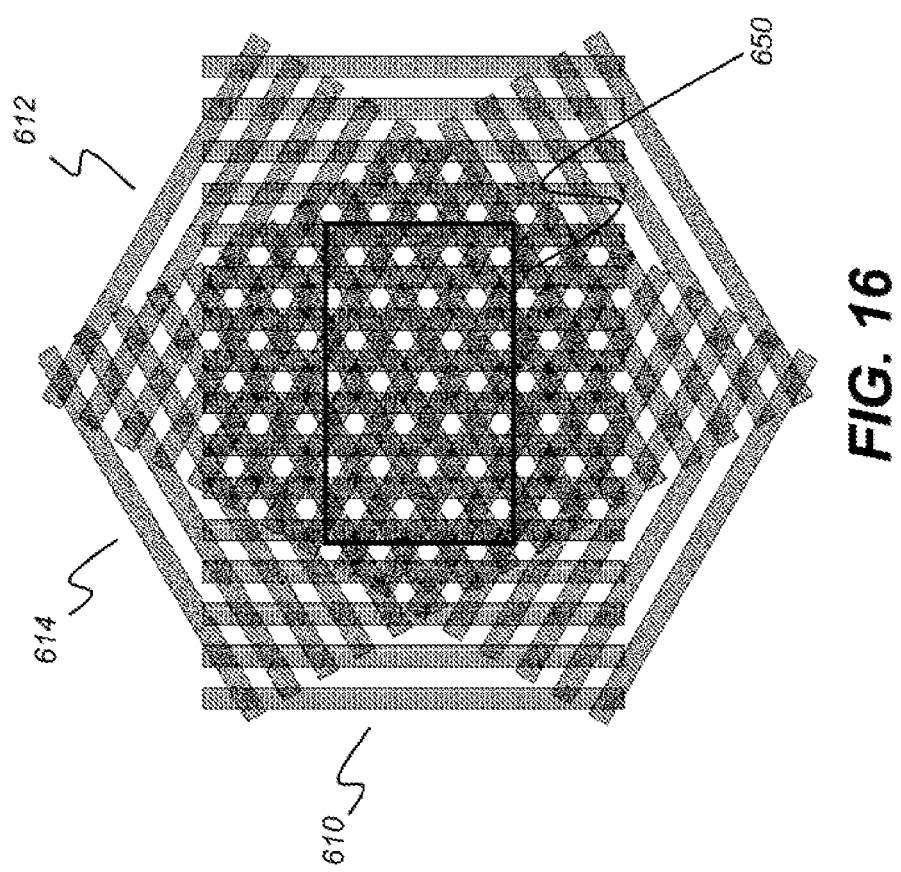
FIG. 16 is a schematic of the three grating patterns of FIG. 15 overlaid to form a compound grating pattern.

FIG. 16 is a schematic showing the three diffraction grating patterns 610, 612, 614 of FIG. 15 overlapping one another. From the overlapping patterns, a region 650 is selected as the final diffraction pattern of a compound diffraction grating. For purposes of illustration, the periods of the gratings are greatly enlarged, and the numbers of periods are greatly reduced.

Figure 17:
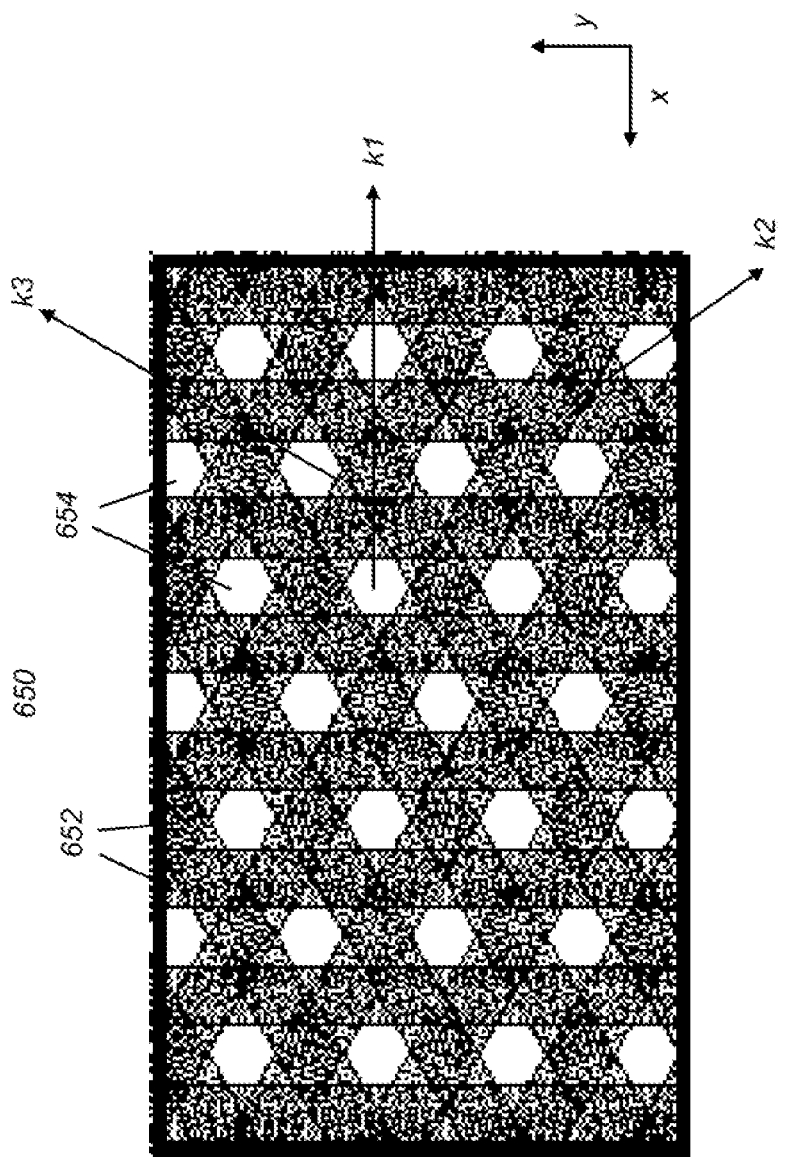
FIG. 17 is a schematic of the region of overlap from FIG. 16 selected for the compound grating pattern.

FIG. 17 is an enlarged schematic of the region 650 showing the regions 652 where material is removed and regions 654 where the original substrate material remains. The remaining regions 654 can be referred to as grating features, and with respect to this arrangement of grating patterns, the grating features have a hexagonal shape. In other distributions of removed material to remaining material, the grating features can take other shapes.

Figure 18:
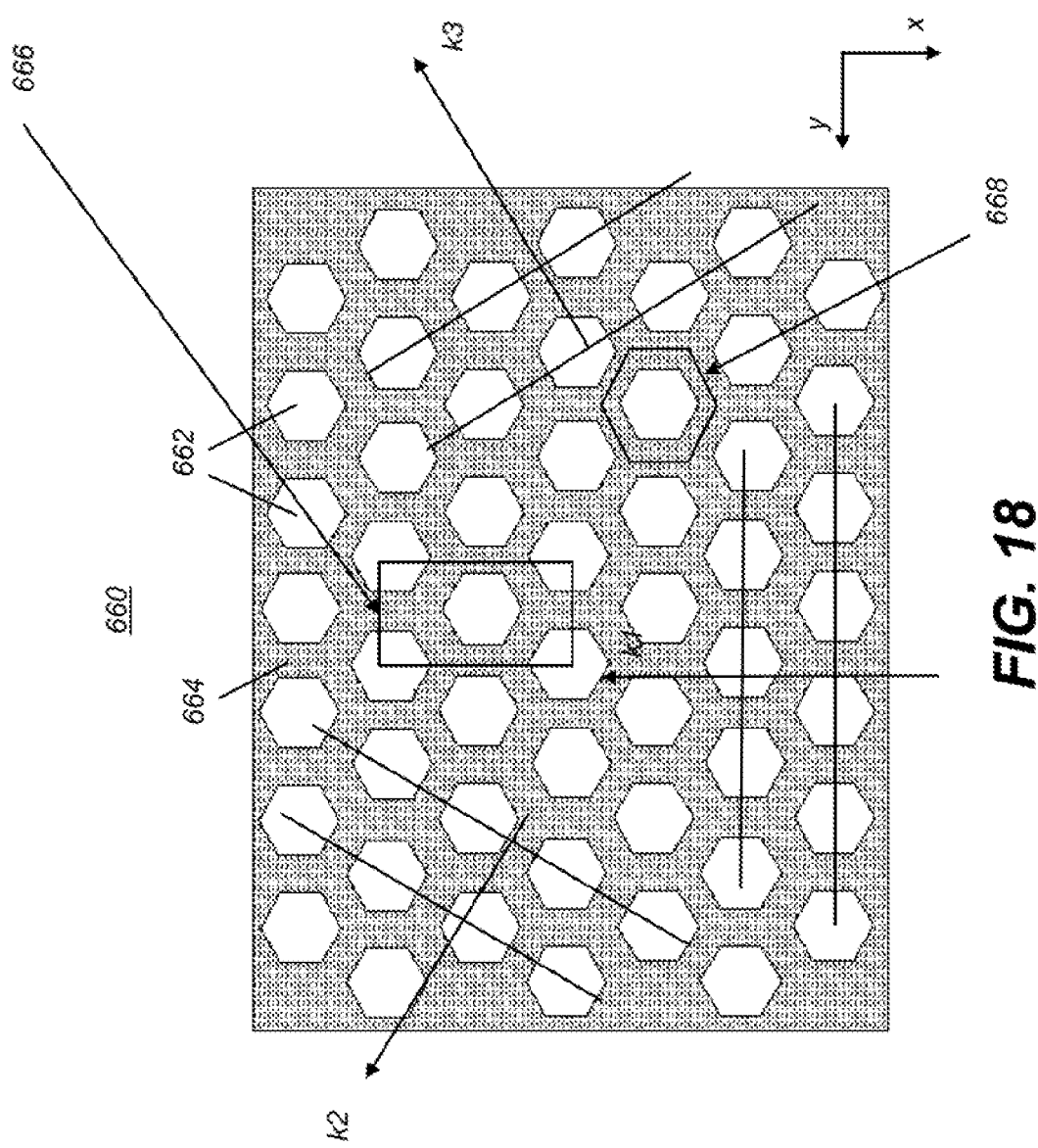
FIG. 18 is a schematic of another compound grating pattern having an arrangement of grating features in which the compound grating pattern is further defined by unit cells.

FIG. 18 shows a schematic of a compound grating pattern 660 formed with three overlapping diffraction patterns. The dark regions 664 represent areas where original material has been removed to form the grating 660. The remaining regions contain hexagonal grating features 654. Here, the grating patterns are formed by the arrangements of the grating features themselves based on the replication of unit cells into a two-dimensional lattice. For example, the depicted patterns can be formed by the replication of a rectangular unit cell 666 or a hexagonal unit cell 668. Either of the unit cells 666 or 668 can define the entire compound grating pattern 660 by contiguous replication of the respective unit cells with adjacent unit cells sharing vertices within the two-dimensional lattice. Although the grating vectors k1, k2, and k3 are relatively oriented with respect to each other through 60 degrees like the compound grating pattern 650 of FIG. 17, the unit cell definitions of the compound grating pattern 660 provide additional freedoms for further shaping and orienting the grating features 662 within the same overall grating patterns. For example, the same relative orientations and periods of the grating vectors k1, k2, and k3 would remain unchanged even if the grating features 662 were shaped as squares, rectangles, circles or ovals. In addition, the grating features 662 can be defined by either material remaining following a machining operation or material removed by a machining operation. More broadly, the grating features can be defined by an optical property that differentiates the grating features from their surroundings, such as a difference in refractive index.

FIG. 19 depicts another compound grating pattern 700 including two overlapping grating patterns demarcated by generally orthogonal grating vectors k1 and k2 based on a rectangular unit cell 702. In the arrangement shown, grating vector k1 extends generally parallel to the x coordinate axis, and the grating vector k2 extends generally parallel to the y coordinate axis. A grating feature 704 is defined within each rectangular unit cell.

While the compound grating patter 700 can still be defined as a two-dimensional lattice, the grating feature 704 spans one dimension of the unit cell 702 along the x coordinate axis such that the grating feature 704 within the rectangular unit cells 702 is contiguous with the grating features 704 of adjoining unit cells 702 along the x coordinate axis. As such, the periodicity of the compound grating pattern in the k1 vector direction is created by regular variations of the grating feature 704 in the y coordinate direction. The regular variation defining the periodicity of the k1 grating vector is a saw tooth pattern. The periodicity of the compound grating pattern in the k2 vector direction is created by the regular or average spacing between the rows of contiguous grating features in the y coordinate direction.

Notably, the grating pattern defined by periodic variations in the y coordinate direction associated with the k2 grating vector are more pronounced than the grating pattern defined by periodic variations in the x coordinate direction associated with the k1 grating vector. Considered as grating lines, the individual grating lines associated with the k1 grating vector extend discontinuously along the y coordinate axis whereas the individual grating lines associated with the k2 grating vector extend more continuously along the x coordinate axis. This structural disparity favors diffractions associated with the k2 vector over diffractions associated with the k1 grating vector for enhancing the spread (i.e., expansion) of the image bearing beams along the y coordinate axis.

Figure 20A:
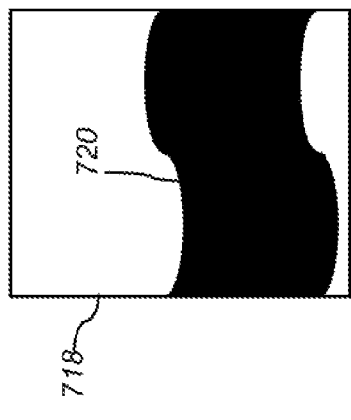
FIGS. 20A, 20B, and 20C depict alternative forms of the unit cell of FIG. 19 with FIG. 20D depicting various diffractive orders associated with assemblies of the variously formed unit cells.
Figure 20B:
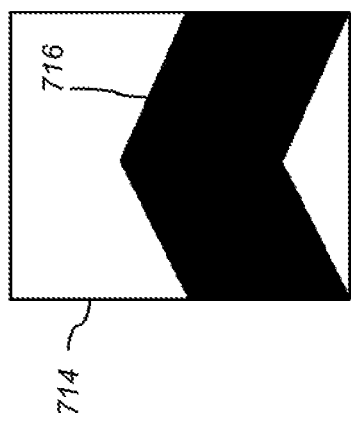
Figure 20C:
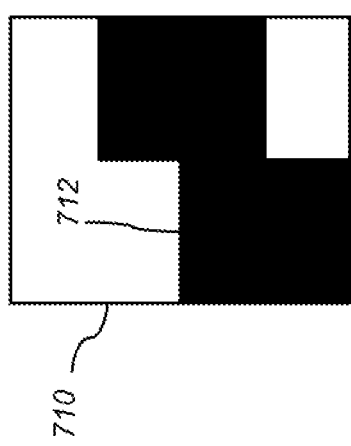

FIGS. 20A, 20B, and 20C depict three alternative rectangular unit cells 710, 714, and 718 with differently shaped grating features 712, 716, 720 that extend contiguously along the x coordinate axis. While the grating feature 716 of the rectangular unit cell 714 is like the grating feature 704 of the rectangular unit cell 702 of FIG. 19, the grating feature 712 of the rectangular unit cell 710 is closer to a unit of a square wave, and the grating feature 720 of the rectangular unit cell 718 is closer to sinusoidal wave.

Figure 20D:
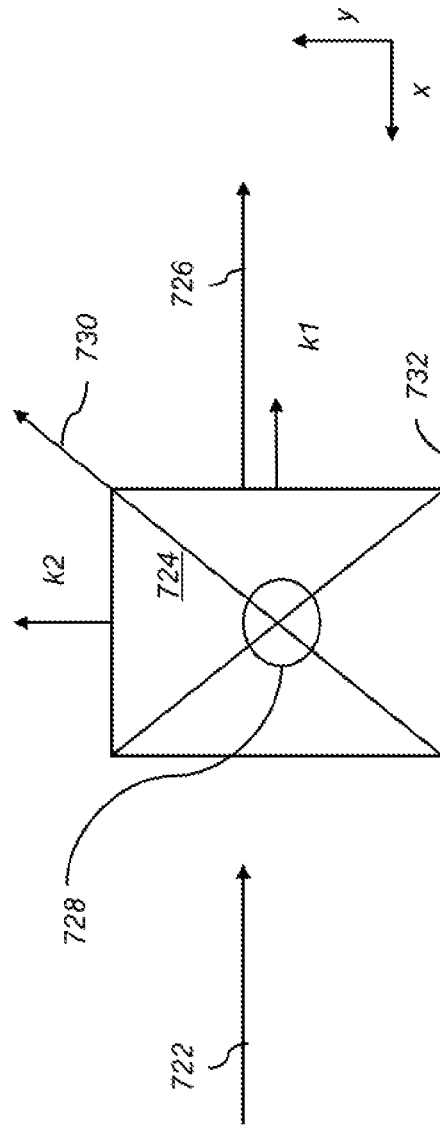

However, as shown diagrammatically in FIG. 20D, all three rectangular unit cells 710, 714, and 718 define compound grating patterns with orthogonal grating vectors k1 and k2. The arrow 722 represents a nominal direction of propagation among the image-bearing beams approaching the schematic rectangular unit cell 724, which defines the unit vectors k1 and k2, resulting in the diffraction of light through various angles. Light diffracted through the zero order along arrow 726 continues to propagate by TIR along the waveguide without change until encountering the same or similar unit cell pattern structure elsewhere within the compound grating pattern along the direction of propagation. In the x-y plane of the waveguide, the portions of the image-bearing beams diffracted through the zero order represented by the arrow 726 maintain their original directions of propagation.

Various first order diffractions are possible based on the compound diffraction grating pattern. For example, portions of the image-bearing beams are diffracted out of the waveguide as depicted by the circle 728 primarily based on an encounter with the grating pattern defined by the k1 vector like a conventional out-coupling diffractive optic. The grating vector k1 preferably matches the grating vector of the in-coupling diffractive optic so that the image-bearing beams ejected from the waveguide are decoded into their original angularly related form. However, the compound grating pattern also produces other first order diffractions depicted by arrows 730 and 732 along diagonals of the unit cell 724, which spread portions of the image-bearing beams out of the nominal direction of propagation. The so diffracted portions remain within the waveguide but can be angularly encoded with respect to each other in a different form, i.e., in a form different from the angularly encoded form imposed by the in-coupling diffractive optic. However, the original angular encoding can be restored by a subsequent encounter with the same or similar unit cell structure elsewhere in the compound grating pattern.

Unlike in hexagonal grid patterns, the y vector of these gratings is independent of the x vector. Image-bearing beam portions redirected by a diffraction order into the waveguide along vectors not parallel to the nominal ray direction of travel can be encoded into a new set of angles. However, a second interaction with an equivalently pitched pattern (in x and y dimensions) effectively unencodes the outcoupled beam portions or returns the beam portions to their prior encoding for travel along their original direction within the waveguide.

FIGS. 21A through 21D depict patterns of successive encounters with an out-coupling diffractive optic 750 defined by a grating structure based on the unit cell of FIG. 20. The out-coupling diffractive optic 750 with overlapping grating patterns performs two primary functions. In addition to ejecting the image-bearing beams from the waveguide, the out-coupling diffractive optic 750 expand the image-bearing beams in two dimensions to increase their common area of overlap within the eyebox. The image-bearing beams are expanded by successions diffractive encounters with the out-coupling diffractive optic, each encounter diffracting the image-bearing beams through different diffractive orders.

Figure 21A:
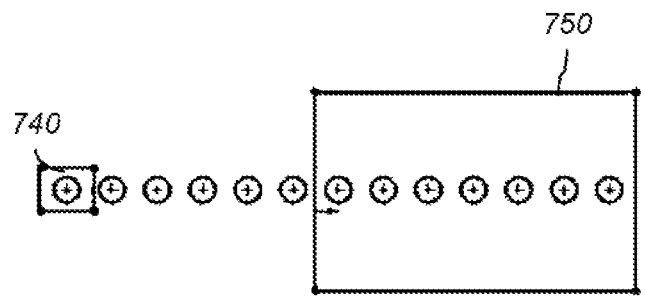
FIGS. 21A, 21B, 21C, and 21D contain schematic depictions of successive TIR encounters of an image-bearing beam along a waveguide from and in-coupling diffractive optic to an out-coupling diffractive optic showing the effects of diffractions through a progression of diffractive orders for expanding an image-bearing beam in two dimensions.

FIG. 21A depict successions of encounters of an image-bearing beam propagating by TIR along the waveguide from an in-coupling diffractive optic 740 to the out-coupling diffractive optic 750. In FIG. 21A, only zero-order diffractions from the out-coupling diffractive optic are shown. Each such encounter, which is equivalent to a TIR reflection, is shown represented by a circle with a centered cross. In the further course of propagation, the zero-order diffracted light reflects from the opposite side surface of the waveguide for subsequent encounters with the out-coupling diffractive optic in positions displaced along the original direction of propagation. Thus, the zero-order diffractions further propagate the considered image-bearing beam along the original direction of propagation as projected onto the x-y plane of the waveguide.

Figure 21B:
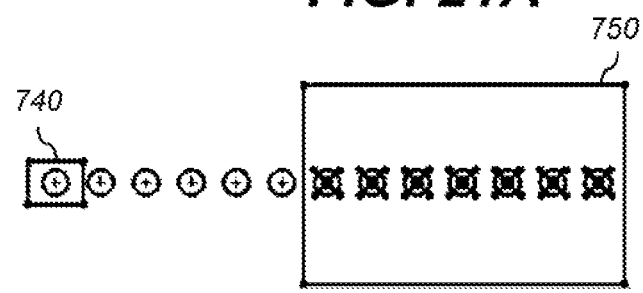

FIG. 21B shows the effect of the first order diffraction designated by circle 716 in FIG. 20D, where decoded light is diffracted upon each encounter out of the waveguide toward the eyebox. The ejected light is depicted as a darkened circle overlaid with an "X". Thus, the image-bearing beam is expanded in the nominal direction of propagation as a succession of relatively displace beamlets, each composed of a portion of the light within one of the original image-bearing beam. The k1 grating vector pattern responsible for such diffractions preferably matches the grating vector orientation and magnitude of the in-coupling diffractive optic to decode the angular relationships imposed upon the image-bearing beams by the in-coupling diffractive optic in a manner equivalent to reversing the direction through which the image-bearing beams originally diffracted from the in-coupling diffractive optic.

Figure 21C:
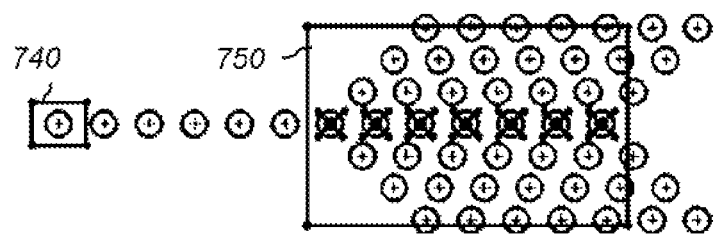

FIG. 21C shows the addition of the first order diffractions designated by the arrows 718 and 720 of FIG. 20D. The additional first order diffractions 718 and 720 diffract portions of the image-bearing beam in different directions that are inclined to the nominal direction of propagation as projected onto the x-y plane of the waveguide. Each encounter being subject to the additional first order diffractions spreads portions of the image-bearing beam in transverse directions throughout the waveguide. Zero-order diffractions also contribute to the spread of the successive encounters by maintaining the instant direction of the additional first order diffractions 718 and 720 through successive encounters.

Each initial diffraction through one of the additional diffraction orders directs a portion of the image-bearing beam out of the nominal direction of propagation. In doing so, the affected portions of the image-bearing beams can be further encoded into a different angularly related form. However, a subsequent diffraction through the same diffractive order essentially operating in reverse can restore both the original angular encoding and the original direction of propagation among the diffracted portions of the image-bearing beams. Although both the encoding and direction of the beam portions are restored, the beam portions are offset in a direction normal to the nominal direction of propagation, having the effect of expanding the image-bearing beams in a second dimension.

Figure 21D:
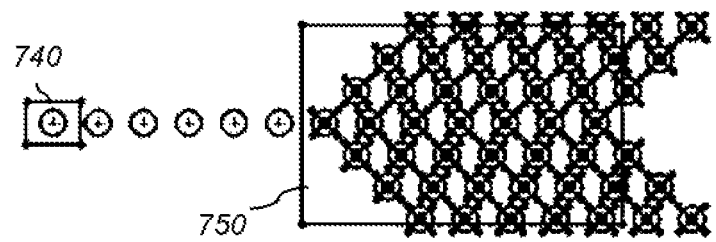

FIG. 21D shows the effect of the first order diffraction designated by circle 716 in FIG. 20D within the expanded range of encounters along the second dimension. Encounters of the beam portions restored in orientation and encoding include the first order diffractions 716 that eject decoded light from the waveguide into the eyebox so that the image-bearing beams overlap within a common area of the eyebox that is expanded in two dimensions.

Figure 22A:
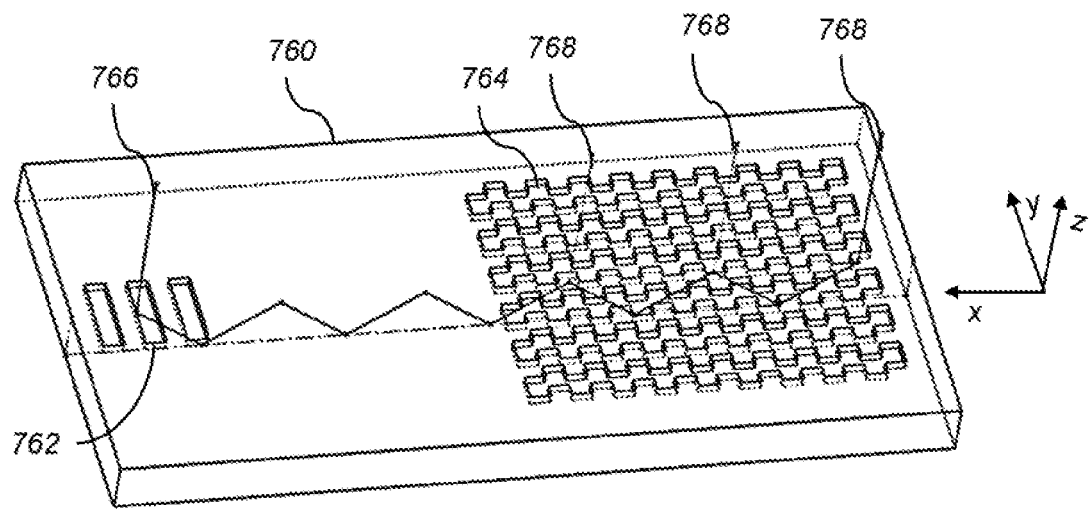
FIG. 22A and FIG. 22B depict respective perspective a plan views of an image light guide for expanding image-bearing beams in the form shown in FIGS. 21A through 21D.
Figure 22B:
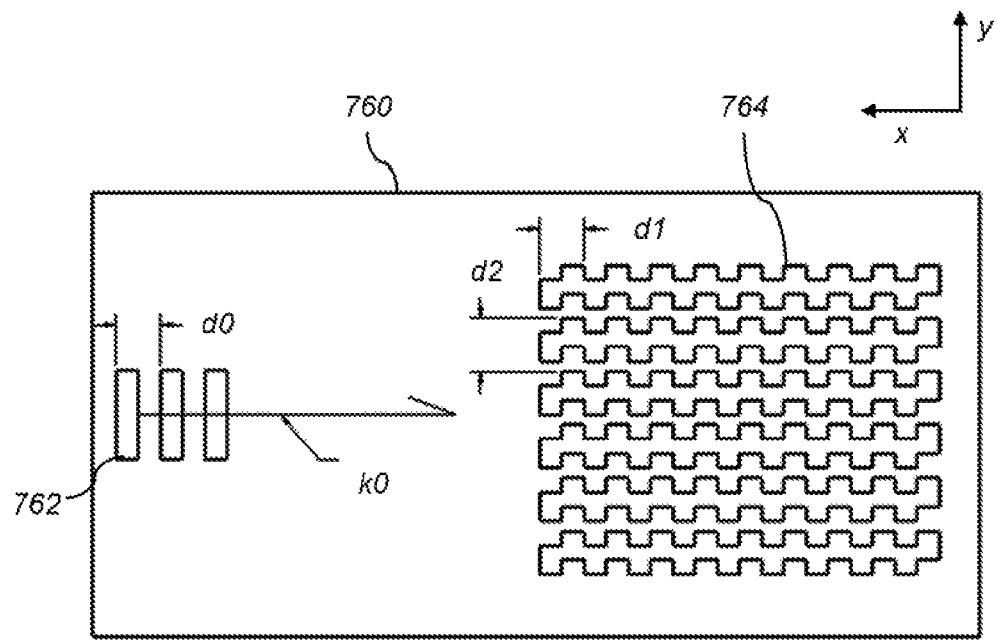

FIGS. 22A and 22B show different views of a waveguide 760 with the grating patterns of an in-coupling diffractive optic 762 and an out-coupling diffractive optic 764 depicted schematically. The grating vector k0 of the in-coupling diffractive optic 762 is aligned with one of the grating vectors of the out-coupling diffractive optic 764, and the period d0 of the in-coupling diffractive optic 762 matches the period d1 of the out-coupling diffractive optic 764. Thus, the encoding of the image-bearing beams diffracted by the in-coupling diffractive optic 762 is decoded by the out-coupling diffractive optic 764 so that the angular relationships among the image-bearing beams (e.g. 766) presented to the in-coupling diffractive optic 762 is restored among the image-bearing beams (e.g., 768) ejected from the out-coupling diffractive optic 764. However, the overlapping grating patterns of the out-coupling diffractive optic 764 also provide for expanding the area of overlap among the ejected beams (e.g., 768) over two dimensions.

Figure 23:
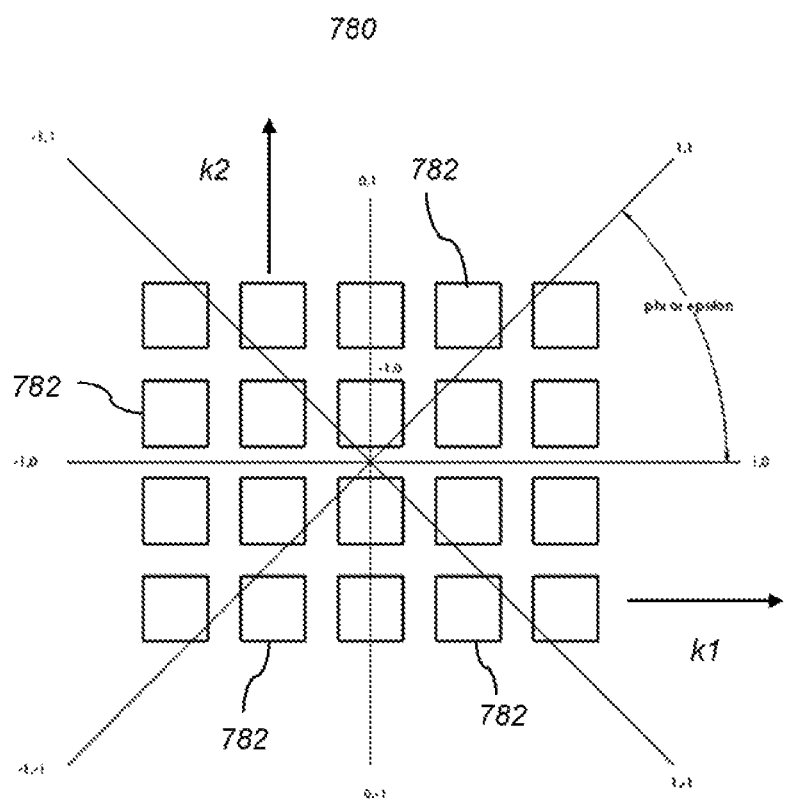
FIG. 23 depicts grating vectors and diffractive orders associated with a rectangular configuration of grating features.

FIG. 23 shows the layout of a compound grating pattern 780 in which square grating features 782 are laid out in a rectangular grid having orthogonal grating vectors k1 and k2. The various orders of diffraction are depicted for distributing light both along the nominal direction of propagation as well as in opposite directions that include components perpendicular to the nominal direction.

Figure 24A:
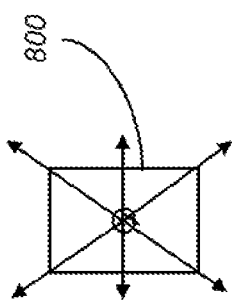
FIG. 24A depicts a unit cell supporting an arrangement of diffractive orders.
Figure 24B:
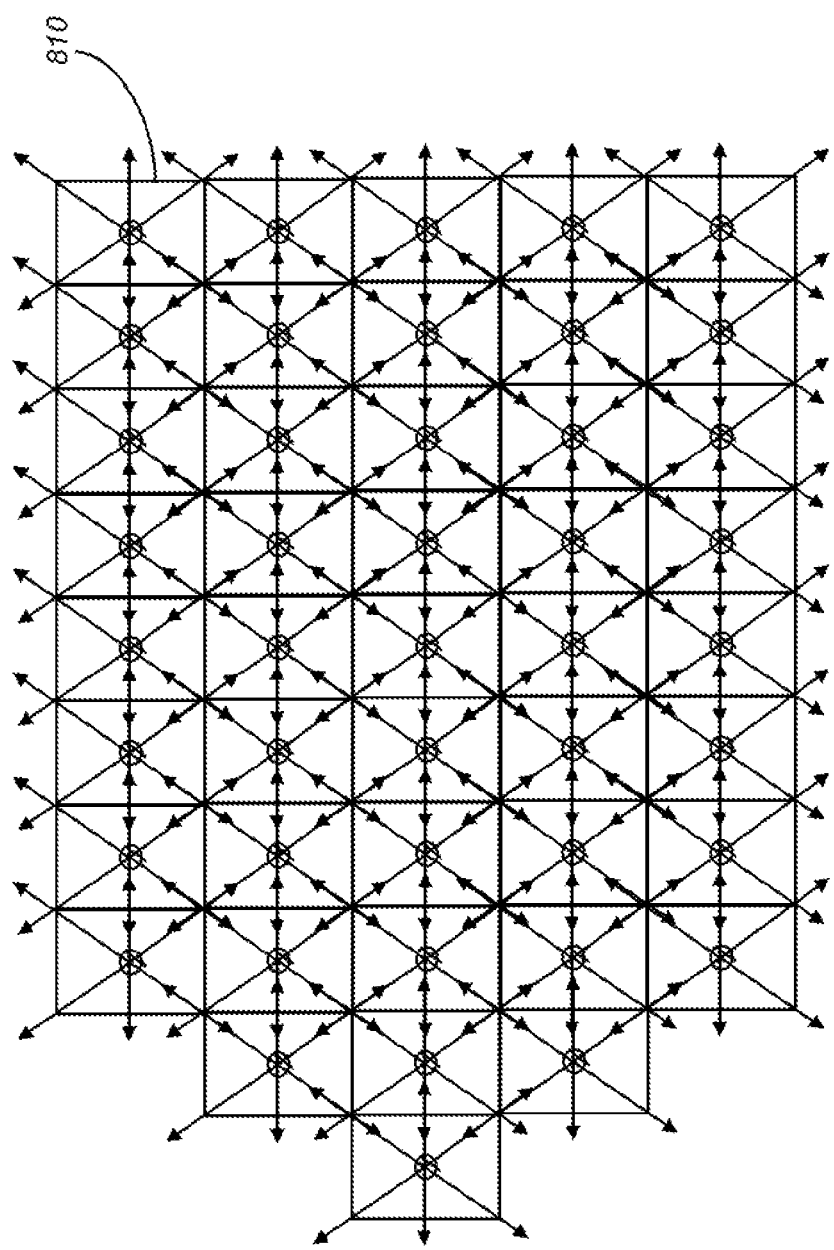
FIG. 24B is an assembly of unit cells according to FIG. 24A into a two-dimensional lattice showing propagations of the various diffractive orders throughout the represented compound grating pattern, whereby image-bearing beams are both expanded in two dimensions and diffracted from the waveguide in a decoded form.

FIG. 24A depicts the diffractive orders of a unit cell 800, which as assembled into the array of FIG. 24B defines a compound grating pattern 810 that can be used as an out-coupling diffractive optic for ejecting decoded image-bearing beams from a waveguide in a form that expands and area of overlap between the image-bearing beams in two dimensions. As an array based on the common unit cell 800, the various diffractive orders that remain within the waveguide propagate in directions aligned with complementary diffractive orders of the adjoining unit cells 800. Thus, at each successive encounter, the remaining portion of the image-bearing beam is diffracted through the same set or a subset of directions. Any further encoding imparted by diffraction out of the nominal direction of propagation can be remove by an equivalent diffraction that restores both the desired encoding and the further nominal direction of propagation at which one of the diffractive orders can be arranged for ejecting the beam portions out of the waveguide for filling an eyebox. In the same way, the diffraction pattern that directs light out of the waveguide into the eyebox is preferably equivalent to the diffraction pattern of the in-coupling diffractive optic so that the encoding imposed upon the image-bearing beams upon diffraction into the waveguide is decoded by the diffraction of the same beams out of the waveguide.

Figure 25:
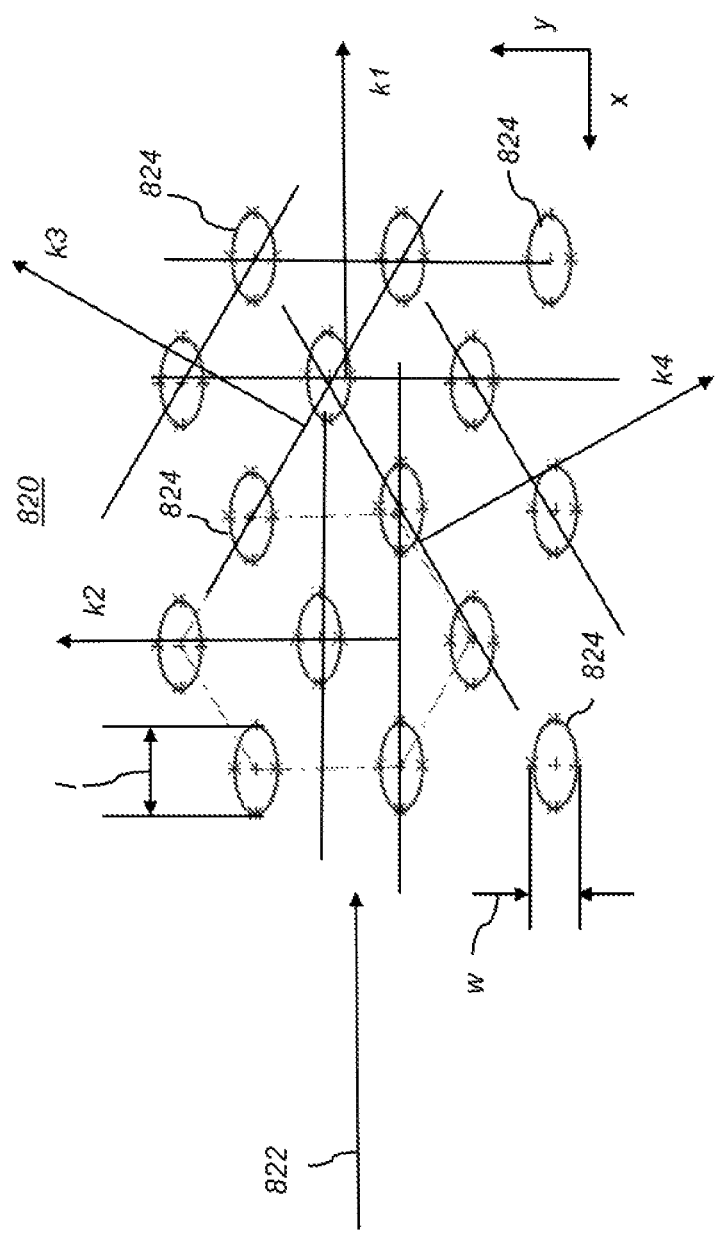
FIG. 25 is a schematic depiction of a compound grating pattern in which the grating features have an aspect ratio that departs from unity.

FIG. 25 depicts a compound grating pattern 820 in the form of a two-dimensional lattice within which four grating patterns have been identified as represented by grating vectors k1, k2, k3, and k4 for variously diffracting a set of image-bearing beams propagating from an in-coupling diffractive optic in the nominal direction represented by the arrow 822. As shown, each of the grating features 824 has an aspect ratio of length l to width w of greater than unity. Increasing the aspect ratio of the grating features 824, such as into ellipsoidal or rectangular shapes, along the nominal direction 822 of input beams reduces the energy into the out-coupled diffraction orders while increasing the energy into the turned diffraction orders for favoring expansion of the input beams along the y coordinate axis. As the input beams encounter the compound grating 820 along the nominal direction of propagation 822, too much energy can be directed through the out-coupling diffractive orders, producing uneven illumination within the eyebox. Relatively reducing the width w of the grating features 824 with respect to their length l contributes to filling the eyebox with more even illumination.

Figure 26:
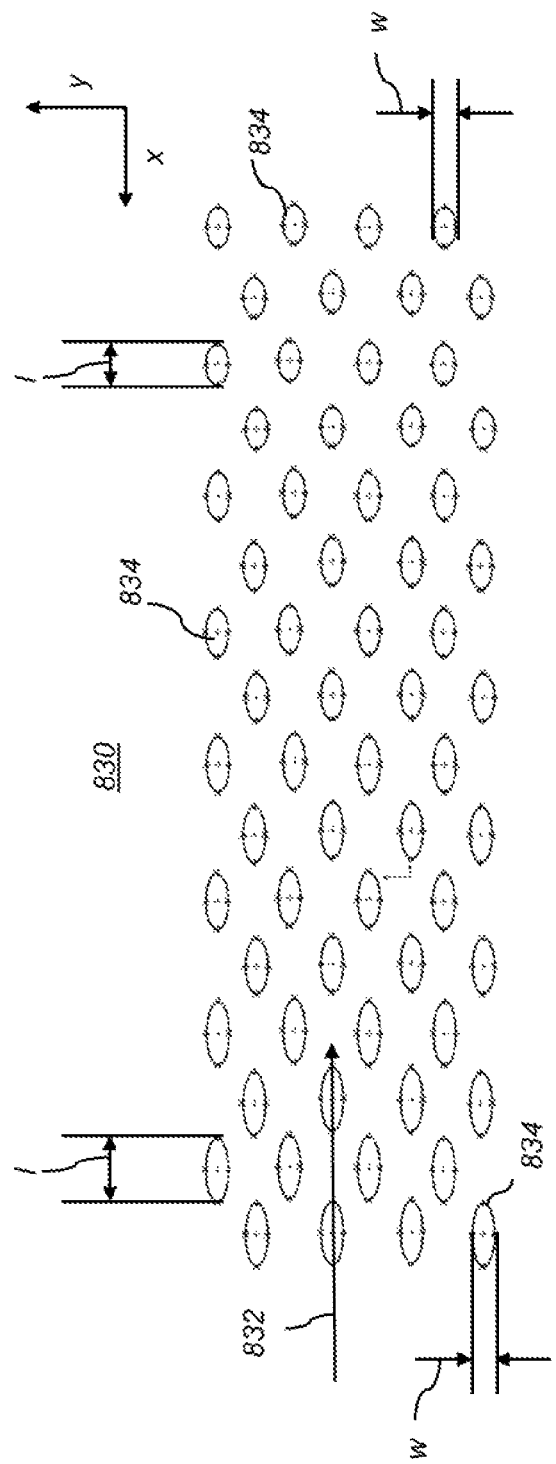
FIG. 26 is a schematic depiction of a compound grating pattern in which the grating features have an aspect ratio that progressively varies along one dimension of the grating.

FIG. 26 depicts another compound grating 830 in the form of a two-dimensional lattice defined by grating vectors oriented like the grating vectors k1, k2, k3, and k4 of the compound grating pattern 820 of FIG. 25. The input beams are also presented to the compound grating 830 in a similar nominal direction of propagation 832. However, the aspect ratio of the grating features 834 progressively varies in the nominal direction of propagation 832. As shown, the width w of the grating features 834 remain the same. However, the lengths of the grating features 834, which start considerably longer than the width of the grating features 834, progressively reduce in length along the nominal direction of propagation 832. Such progressively varying aspect ratios of the grating features 834 can also be used to further balance the out-coupled beam brightness levels throughout the eyebox. Once the image-bearing beams have expanded across the output aperture area of the waveguide along the y coordinate axis, a more balanced (closer to 1:1) aspect ratio can be used to efficiently out-couple the remaining portions of the image-bearing beams within the output aperture.

Thus, in addition to the objective of expanding the image-bearing beams output from the out-coupling diffractive optic along both the x and y coordinate axes to increase their area of overlap within the eyebox, the aspect ratios of the grating features can be varied to more evenly distribute light within the expanded output beams and provide more balanced illumination throughout the eyebox. Both the length l and the width w of the grating features can be varied to control desired distributions of light within the eyebox. In addition to varying aspect ratios in the x and y coordinate directions, the aspect ratios of the grating features can be varied in other orientations, particularly in orientations normal to the grating vectors. In areas of the compound grating at which too much light is out-coupled, the aspect ratio of local grating features can be arranged to favor diffractive orders that tend to distribute light within the waveguide toward other areas of the compound grating at which too little light may otherwise be out-coupled. In addition, out-coupling can be promoted is areas that would otherwise out-couple too little light.

In addition to defining the unit cells by the grating vectors and attendant diffractive orders that the arrangement of unit cells will support, the shape of the grating features within the unit cells as well as the relative refractive index and the height or depth of the grating features can be controlled to influence distributions of light among the diffractive orders of each unit cell.

While the decoded light is generally ejected from the waveguide by encounters with a grating pattern having a grating vector along the nominal direction of propagation, the three grating patterns can be oriented at 60 degrees to one another with substantially equal pitch to preserve angular encoding while providing more opportunities for ejecting light from the waveguide as shown for example in FIGS. 16 through 18. With the first grating pattern oriented perpendicular to the nominal direction of propagation, the second and third grating patterns can be respectively oriented at plus 60 degrees and minus 60 degrees thereto. Image-bearing beam portions encountering the second grating pattern can be diffracted through a first order on a pathway substantially perpendicular to the third grating pattern. In this orientation, the beam portions can be ejected from the waveguide by diffractions from the third grating pattern through a similar first order. Similarly, image-bearing beam portions encountering the third grating pattern can be diffracted through a first order on a pathway substantially perpendicular to the second grating pattern. In this orientation, the beam portions can be ejected from the waveguide by diffractions from the second grating pattern through a similar first order.

Succeeding encounters with the second grating pattern through the intermediacy of an encounter with the first grating pattern allow the subsequent encounter with the second grating pattern to eject decoded light from the waveguide toward the eyebox. Without the intermediacy of an encounter with the first diffraction grating, successive encounters with the second diffraction grating or successive encounters with the second diffraction grating through the first diffraction order can restore the so diffracted beam portions along the nominal direction of propagation. Successive encounters through the second, first, and third diffraction patterns through the first order can reorient the so diffracted portions in a direction opposite to the nominal direction of propagation. Combined with the zero-order diffractions from the three grating patterns that preserve the instant direction of propagation in the x-y plane, the various encounters and reencounters with the three grating patterns circulate light portions of each of the image-bearing beams throughout the out-coupling optic in ways that preserve the original encoding of the image-bearing beams for ejection from the waveguide through various encounters with each of the three grating patterns.

Fabrication of Grating Patterns in Image Light Guides

The compound grating patterns can be formed as a volume hologram optical element (HOE). As is well known to those skilled in the art, a volume HOE is a hologram where the thickness of the recording material is much larger than the light wavelength used for recording. Alternatively, the overlapping grating patterns can be realized as a 2-dimensional (2-D) photonic crystal. Alternatively, the compound grating patterns can be formed as a 3-dimensional (3-D) photonic crystal. As is known to those skilled in the art, 2-D photonic crystals can be fabricated by photolithography, or by drilling holes in a suitable substrate. As is known to those skilled in the art, fabrication methods for 3-D photonic crystals include stacking multiple 2-D layers on top of each other, direct laser writing, or instigating self-assembly of spheres in a matrix and dissolving the spheres.

The in-coupling and out-coupling diffractive optics IDO and ODO can be, but are not limited to, diffraction gratings or formed as volume holograms, or formed from a holographic polymer dispersed liquid crystal, for example. The waveguide substrate S of the image light guide is typically glass or other optical material with sufficient index of refraction for supporting TIR transmission between in-coupling diffractive optic, distribution gratings, and out-coupling diffractive optic.

The in-coupling diffractive optics IDO and out-coupling diffractive optics ODO can have different orientations and grating periods appropriate to their functions. After proper surface preparation of a glass substrate blank, the diffraction components can be formed on one or both outer surfaces of the image light guide using nano-imprinting methods, for example. At least one of the in-couplings and out-couplings can be a surface relief diffraction grating.

As known to those skilled in the arts, one method for the removal of substrate material is by electron-beam machining. Electron-beam machining is a process where high-velocity electrons concentrated into a narrow beam are directed toward the work piece, creating heat and vaporizing the material.

Figure 27A:
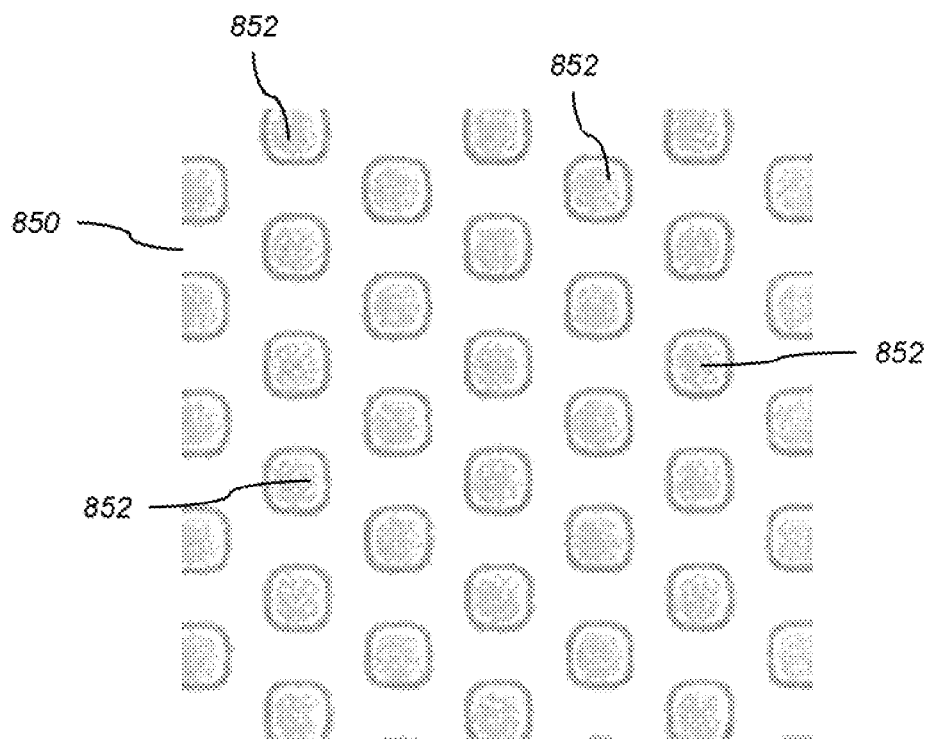
FIGS. 27A and 27B are SEM images showing examples of an as-manufactured compound grating patterns.
Figure 27B:
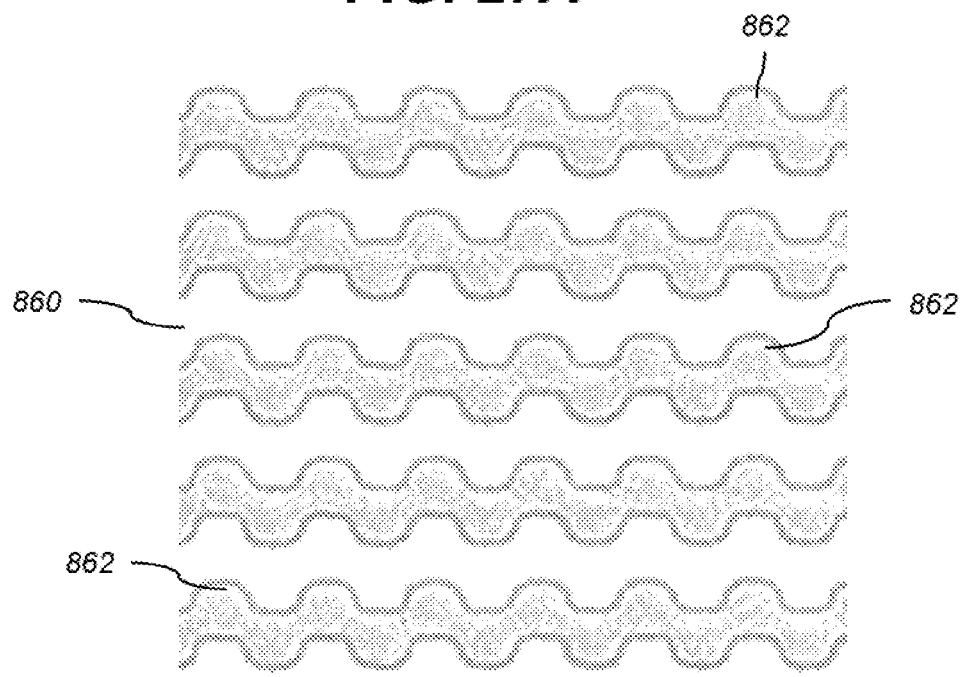

FIG. 27A and FIG. 27B show processed SEM images of electron-beam manufactured grating patterns. FIG. 27A depicts a compound grating pattern 850 as a manufactured realization of the grating pattern 660 of FIG. 18, and FIG. 27B depicts a compound grating pattern 860 as a manufactured realization of the grating pattern shown in FIG. 19. In both cases, and as known to those skilled in the arts, the manufactured results will approximate the idealization of the grating patterns. In particular, the grating features 662 shown in FIG. 18 are manufactured as grating 852 features having rounded corners as shown in FIG. 27A. Similarly, the sharp corners of the grating features 704 shown in FIG. 19 are realized in manufacturing as grating features 862 having rounded corners as shown in FIG. 27B. Different manufacturing processes will result in different degrees of approximation of fine features of a grating pattern.

The invention has been described in detail with reference to presently preferred embodiments, but it will be understood that variations and modifications can be effected within the spirit and scope of the invention. The presently disclosed embodiments are therefore considered in all respects to be illustrative and not restrictive.

The invention claimed is:

1. An image light guide for conveying a virtual image comprising:
    a waveguide having a transmissive substrate with front and back surfaces, wherein the substrate is operable to propagate image-bearing light beams along a length of the waveguide;
    an in-coupling diffractive optic formed along the waveguide, wherein the in-coupling diffractive optic is operable to diffract the image-bearing light beams from an image source into the waveguide, whereby at least a portion of each of the image-bearing light beams propagates along the waveguide in an angularly encoded form;
    an out-coupling diffractive optic spaced apart from the in-coupling diffractive optic along the length of the waveguide, wherein the out-coupling diffractive optic is operable to diffract the image-bearing light beams from the waveguide in an angularly decoded form toward an eyebox;

the out-coupling diffractive optic including two or more grating patterns in different orientations;

one or more of the grating patterns being arranged in a primary orientation, wherein the one or more grating patterns arranged in the primary orientation are operable to diffract first portions of each of the image-bearing light beams propagating in an original nominal direction along the waveguide; and one or more other of the grating patterns being arranged in one or more non-primary orientations, wherein the one or more grating patterns arranged in non-primary orientations are operable to diffract second portions of each of the image-bearing light beams out of the original direction of propagation along the waveguide and operable to diffract the second portions of each of the image-bearing light beams back toward the original nominal direction of propagation along the waveguide in positions that are relatively offset in a direction normal to the original nominal direction of propagation, wherein the two or more diffraction patterns are operable to relatively displace portions of each of the image-bearing light beams in two dimensions for expanding an area of overlap among the image-bearing light beams within the eyebox;

wherein a first grating pattern arranged in the primary orientation comprises continuous non-intersected rows of grating features having variations in a first direction, and the variations in the first direction define a periodicity of the first grating pattern; and wherein a second grating pattern arranged in the non-primary orientation is defined by a spacing of the rows of grating features in the first direction.

2. The image light guide of claim 1 in which the first portions of each of the image-bearing light beams are relatively displaced in the original nominal direction of propagation along the waveguide for expanding a first dimension of an area of overlap among the image-bearing light beams within the eyebox.

3. The image light guide of claim 2 in which the second portions of each of the image-bearing light beams are relatively displaced in the direction normal to the original nominal direction of propagation along the waveguide for expanding a second dimension of the area of overlap among the image-bearing light beams within the eyebox.

4. The image light guide of claim 1 in which the one or more of the grating patterns arranged in a primary orientation include a first grating pattern having a first grating vector, and the one or more other of the grating patterns arranged in one or more of the non-primary orientations include a second grating pattern having a second grating vector that is inclined to the first grating vector.

5. The image light guide of claim 4 in which the second grating vector is inclined at an angle of at least 30 degrees to the first grating vector.

6. The image light guide of claim 4 in which the one or more other of the grating patterns arranged in one or more of the non-primary orientations include a third grating pattern having a third grating vector that is inclined to both the first and second grating vectors.

7. The image light guide of claim 6 in which the second and third grating vectors are inclined to the first grating vector by approximately the same amount in different directions.

8. The image light guide of claim 6 in which the second and third grating vectors are in part defined by a second pitch and a third pitch that are equal to each other.

9. The image light guide of claim 8 in which the first grating vector is in part defined by a first pitch that is different from the second and third pitches.

10. The image light guide of claim 1 in which the two or more grating patterns are formed by an arrangement of grating features in the same plane.

11. The image light guide of claim 1 in which the two or more grating patterns are formed by an arrangement of grating features in different planes.

12. The image light guide of claim 1 in which the two or more grating patterns in different orientations are formed in a common plane.

13. The image light guide of claim 1 in which the two or more grating patterns in different orientations are formed within a volume hologram.

14. The image light guide of claim 1
wherein the two or more diffraction patterns comprise a plurality of diffractive features, and each of the diffractive features defines an aspect ratio of length to width;
wherein the aspect ratio of at least some of the diffractive features departs from unity, whereby the aspect ratio is operable to alter diffraction efficiencies between the two or more diffraction patterns; and
wherein the aspect ratio of the diffractive features varies along the first direction.

15. The image light guide of claim 14 in which the image-bearing beams approach the out-coupling diffractive optic along a nominal direction of propagation, and the aspect ratio of the diffractive features varies along the nominal direction of propagation.

16. An image light guide for conveying a virtual image comprising:
a waveguide having a transmissive substrate with front and back surfaces, wherein the substrate is operable to propagate image-bearing light beams along a length of the waveguide;
an in-coupling diffractive optic formed along the waveguide, wherein the in-coupling diffractive optic is operable to diffract the image-bearing light beams from an image source into the waveguide for propagating the image-bearing light beams along the length of the waveguide in an angularly encoded form;
an out-coupling diffractive optic spaced apart from the in-coupling diffractive optic along the length of the waveguide, wherein the out-coupling diffractive optic is operable to diffract the image-bearing light beams from the waveguide in an angularly decoded form toward an eyebox for viewing the image from the image source; and
the out-coupling diffractive optic being formed as a diffraction lattice having a plurality of unit cells in a plane defining two or more diffraction patterns in different orientations within the plane;
wherein one of the diffraction patterns is arranged in a primary orientation for diffracting first portions of each of the image-bearing light beams which propagate in an original nominal direction along the waveguide, and one or more other of the diffraction patterns are arranged in non-primary orientations for diffracting second portions of each of the image-bearing light beams out of the original nominal direction of propagation along the waveguide and for further diffracting the second portions of each of the image-bearing light beams back toward the original nominal direction of propagation along the waveguide in positions that are relatively offset in a direction normal to the original nominal direction of propagation;

wherein the two or more diffraction patterns are operable to relatively displace portions of each of the image-bearing light beams in two dimensions for expanding an area of overlap among the image-bearing light beams within the eyebox;

wherein a first diffraction pattern comprises continuous non-intersected rows of diffractive features having variations in a first direction, wherein the variations in the first direction define a periodicity of the first diffraction pattern;

wherein a second diffraction pattern is defined by a spacing of the rows of diffractive features in the first direction.

17. The image light guide of claim 14 in which the diffraction lattice comprises the diffractive features arranged in a pattern and distinguished by a refractive index difference within the plane.

18. The image light guide of claim 17 in which the plane includes horizontal and vertical dimensions and the diffractive features have corresponding horizontal and vertical dimensions, wherein one of the horizontal and vertical dimensions of the diffractive features varies along a first direction to regulate distributions of light within each of the image-bearing beams.

19. The image light guide of claim 16 in which each row of continuous diffractive features describes a square wave.

20. The image light guide of claim 16 in which each row of continuous diffractive features describes a sinusoidal wave.

21. The image light guide of claim 16 in which the unit cells are in the shape of a polygon.

22. The image light guide of claim 21 in which the unit cells are in the shape of a rectangle.

23. The image light guide of claim 21 in which the unit cells are in the shape of a hexagon.

24. The image light guide of claim 16 in which the two or more of the other of the diffraction patterns arranged in the non-primary orientations are oriented by equal but opposite angles with respect to the diffraction pattern arranged in a primary orientation.

* * * * *